(12) United States Patent
Niioka et al.

(10) Patent No.: US 8,773,517 B2
(45) Date of Patent: Jul. 8, 2014

(54) IMAGE DISPLAY DEVICE AND TERMINAL DEVICE

(75) Inventors: Shinya Niioka, Kawasaki (JP); Koji Shigemura, Kawasaki (JP); Shinichi Uehara, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 1192 days.

(21) Appl. No.: 12/343,020

(22) Filed: Dec. 23, 2008

(65) Prior Publication Data

US 2009/0167846 A1 Jul. 2, 2009

(30) Foreign Application Priority Data

Dec. 26, 2007 (JP) ................................. 2007-335351

(51) Int. Cl.
*H04N 13/04* (2006.01)

(52) U.S. Cl.
USPC ..................................... 348/54; 348/E13.075

(58) Field of Classification Search
USPC ............................................... 348/54, E13.075
See application file for complete search history.

(56) References Cited

U.S. PATENT DOCUMENTS

| | | | | |
|---|---|---|---|---|
| 6,831,678 | B1 * | 12/2004 | Travis | 348/46 |
| 2001/0054987 | A1 * | 12/2001 | Lang et al. | 345/4 |
| 2006/0238664 | A1 * | 10/2006 | Uehara et al. | 349/1 |
| 2006/0274422 | A1 * | 12/2006 | Fukunaga | 359/649 |
| 2007/0279941 | A1 * | 12/2007 | Koshio | 362/623 |
| 2008/0278641 | A1 * | 11/2008 | Uehara | 349/15 |
| 2009/0309873 | A1 * | 12/2009 | Saishu et al. | 345/419 |

FOREIGN PATENT DOCUMENTS

| | | |
|---|---|---|
| CN | 1652005 A | 8/2005 |
| JP | 06-332354 A | 12/1994 |
| JP | 08-184846 A | 7/1996 |
| JP | 2004-280078 A | 10/2004 |
| JP | 2004-280079 A | 10/2004 |
| JP | 2007-093767 A | 4/2007 |

OTHER PUBLICATIONS

Chihiro Masuda, "Three-dimensional display", Sangyo Tosho Publishing Co., Ltd.
Japanese Office Action issued Jul. 24, 2012 in corresponding Japanese Patent Application No. 2007-335351.

* cited by examiner

*Primary Examiner* — Alina N. Boutah
(74) *Attorney, Agent, or Firm* — Sughrue Mion, PLLC

(57) ABSTRACT

To provide an image display device of an excellent display quality with which the brightness is not deteriorated in reflective displays, and to provide a portable terminal using the same. Provided is a display device which includes: a plurality of arranged display elements each including at least a pixel for displaying a first-viewpoint image and a pixel for displaying a second-viewpoint image, each of the pixels having a transmissive display area for transmitting light and a reflective display area for reflecting external light; and an optical device for distributing light emitted from each of the pixels to different directions from each other, wherein the reflective display areas of each of the display elements are arranged asymmetrically with respect to an axis that is perpendicular to an image distributing direction.

12 Claims, 35 Drawing Sheets

IMAGE DISPLAY DEVICE AND TERMINAL DEVICE

CROSS-REFERENCE TO RELATED APPLICATION

This application is based upon and claims the benefit of priority from Japanese patent application No. 2007-335351, filed on Dec. 26, 2007, the disclosure of which is incorporated herein in its entirety by reference.

BACKGROUND OF THE INVENTION

1. Field of the Invention

The present invention relates to an image display device capable of displaying different images for a plurality of viewpoints, and to a terminal device having the image display device loaded thereon. More specifically, the present invention relates to an image display device and a terminal device capable of displaying stereoscopic images of an excellent quality.

2. Description of the Related Art

There have been conducted studies on image display devices capable of displaying different images for a plurality of viewpoints. As an example, there is a stereoscopic liquid crystal display device which makes it possible to provide different displays for a plurality of viewpoints by using an optical element capable of separating images.

To achieve such function, there have been conducted studies on a large number of stereoscopic image display systems. This type of stereoscopic image display systems can be classified roughly into two types, i.e., one is a type that uses an eyeglass, and the other is a type that does not use any eyeglass. The type using an eyeglass includes a polarizing eyeglass type which utilizes polarization and an anaglyph system that utilizes differences in colors, etc.

In the meantime, each of the above-described systems essentially cannot avoid a troublesome work of wearing an eyeglass. Thus, there have recently been active studies conducted on the no-eyeglass system that does not require any eyeglass. As such no-eyeglass system, there are a parallax barrier type, a lenticular lens type, and the like. With these types, images with parallax are presented for both eyes on the left and right sides, respectively, so as to achieve a stereoscopic image display device.

The lenticular lens type of this no-glass system was proposed in 1910s by Ives et al. as depicted in "Three-dimensional display" Chihiro MASUDA, Sangyo Tosho Publishing Co., Ltd. (Non-Patent Document 1), for example. FIG. 28 shows an example of this lenticular lens 121. As shown in FIG. 28, the lenticular lens 121 has a plane on its one face, and a plurality of semicylindrical convex parts (cylindrical lenses) 122 extended along one direction are formed on the other face in such a manner the longitudinal directions thereof are in parallel to each other.

Further, FIG. 30 shows an optical model diagram regarding a stereoscopic image display method when using the lenticular lens 121. As shown in FIG. 30, the lenticular lens 121, a display panel 106, and a light source 108 are disposed in order from the viewer side, and pixels of the display panel 106 are located on the focal plane of the lenticular lens 121.

Referring to FIG. 30 mentioned above, pixels 123 for displaying images for right eye 141 and pixels 124 for displaying images for left eye 142 are alternately arranged in the display panel 106. In this case, the group of mutually neighboring pixels 123 and 124 correspond to each convex part 122 of the lenticular lens 121. With this, light emitted from the light source 108 and transmitted through each of the pixels 123 and 124 is distributed to directions towards the left and right eyes by the convex parts 122 of the lenticular lens 121. This enables the left and right eyes to recognize different images, thereby making it possible for the viewer to recognize stereoscopic images.

In the meantime, the parallax barrier type was conceived by Berthier in 1896, and it was substantiated by Ives in 1903. FIG. 29 mentioned above is an optical model diagram which shows a stereoscopic image display method using a parallax barrier. As shown in FIG. 29, a parallax barrier 105 is a barrier (shielding plate) on which a large number of thin stripe-type openings (that is, slits 105a) are formed. A display panel 106 is disposed in the vicinity of one of the surfaces of the parallax barrier 105.

In this display panel 106, right-eye pixels 123 and left-eye pixels 124 are arranged in the direction orthogonal to the longitudinal direction of the slits 105a. Further, a light source 108 is disposed in the vicinity of the other surface of the parallax barrier 105, i.e., on the opposite side of the display panel 106.

Among the light emitted from the light source 108, the light passed through the opening parts (slits 105a) of the parallax barrier 105 and then transmitted the right-eye pixels 123 turns out as light flux 181 as shown in FIG. 29. Similarly, among the light emitted from the light source 108, the light passed through the slits 105a and then transmitted the left-eye pixels 124 turns out as light flux 182. Here, the position of the viewer at which a stereoscopic image can be recognized is determined depending on the positional relation between the parallax barrier 105 and the pixels. That is, it is necessary for the right eye 141 of the viewer to be within a passing area of all the light fluxes 181 that correspond to a plurality of right-eye pixels 123, and for the left eye 142 of the viewer to be within a passing area of all the light fluxes 182.

This is a case where the middle point 143 of the right eye 141 and the left eye 142 of the viewer is located within a quadrilateral stereoscopy viewable area 107 shown in FIG. 29. A segment passing through an intersection point 107a of diagonal lines in the stereoscopy viewable area 107 is the longest segment among the segments extended in the arranging directions of the right-eye pixels 123 and the left-eye pixels 124 in the stereoscopy viewable area 107. Thus, when the middle point 143 comes at the intersection point 107a, the allowance for the position of the viewer to be shifted in the left and right directions becomes the maximum. Therefore, it is the most preferable position as the viewing position.

Accordingly, in this stereoscopic image display method, the distance between the intersection point 107a and the display panel 106 is defined as the optimum viewing distance OD (=S), and it is recommended to the viewer to view the images at this distance S. Note that a virtual plane in the stereoscopy viewable area 107 at which the distance from the display panel 106 is the optimum viewing distance S is referred to as an optimum viewing plane 107b. With this, the light from the right-eye pixels 123 and the left-eye pixels 124 is to reach the right eye 141 and the left eye 142 of the viewer, respectively. Therefore, the viewer can recognize the image displayed on the display panel 106 as a stereoscopic image.

At the time when the parallax barrier system is initially conceived, there was an issue of having an obstacle and low visibility since the parallax barrier was placed between the pixels and the eyes. Due to the recently achieved liquid crystal display devices, however, the visibility has been improved because it is possible to place the parallax barrier 105 in the back side of the display panel 106 as shown in FIG. 29.

Thereby, there have now been studies actively conducted on the parallax-barrier type stereoscopic image display devices.

Note here that the above-described parallax barrier type is a type which "conceals" unnecessary light rays by the barrier, whereas the above-described lenticular lens type is a type which changes the traveling direction of the light. Thus, the latter type, i.e., the lenticular lens type, has such an advantage that there is no degradation in the brightness of the display screen theoretically. Because of this advantage, there has been considered application of the lenticular lens type to portable devices and the like where the high-luminance display and low-power consumption performance are taken into serious consideration. The conventional stereoscopic image display devices using the lenticular lenses use transmissive-type liquid crystal display devices as the display panels thereof.

Further, other than the stereoscopic image display device described above, a plural-image simultaneous display device which displays a plurality of images simultaneously is also developed as the image display device using the lenticular lens (see Japanese Unexamined Patent Publication 06-332354 (Patent Document 1), for example). This plural-image simultaneous display device is a display which displays different images for each of the viewing directions simultaneously with a same condition by utilizing an image distributing function of the lenticular lens.

This enables a single plural-image simultaneous image display device to provide different images with each other simultaneously to a plurality of viewers located at different directions from each other with respect to the display device. Patent Document 1 depicts that the use of this plural-image simultaneous display device makes it possible to decrease the setting space and the cost for the electricity compared to a case where it is necessary to prepare the number of normal single-image display devices for the number of images to be displayed simultaneously.

Further, the use of a reflective-type image display device having a reflection plate as a display panel has been investigated. This reflective-type image display device reflects light making incident from the outside by the reflection plate located inside the display device and utilizes the reflected light as a display light source. Thus, a back light or a side light as the light source is unnecessary.

In the meantime, the transmissive-type image display device requires a backlight, side light, or the like. Thus, when the reflective-type image display device is used for the display panel, lower power consumption can be achieved than a case of using the transmissive-type image display device. Therefore, the reflective-type image display devices have actively been applied to portable devices and the like in these days.

However, in such case where the reflective-type image display device is used, the external light is reflected as if it is reflected by a mirror plane when the reflection plate has a flat-face shape. Therefore, there is such an issue that a figure of the light source such as a fluorescent light is reflected so that the display quality is deteriorated. Further, only the light making incident from specific angles with respect to the viewer becomes contributed to the display, so that the use efficiency of the external light is deteriorated.

In order to improve such issues, Japanese Unexamined Patent Publication 08-184846 (Patent Document 2) proposes a technique which provides uneven shapes on a reflection plate. FIG. 31 shows a structural example of the reflection plate having the uneven shapes. According to Patent Document 2, an organic film is provided on a lower layer of a reflection plate 41, and unevenness is provided on the surface of the organic film to form uneven shapes 41a on the surface of the reflection plate 41. With the uneven shapes, external light making incident from a specific direction is reflected by being diffused towards various directions. Further, external light making incident from various directions is reflected also to the direction of the viewer. As a result, reflection of the figure of the light source can be prevented, thereby making it possible to utilize the external light of various angles for the display.

Further, Japanese Unexamined Patent Publication 2004-280079 (Patent Document 3) proposes a stereoscopic image display device that has a reflecting function. FIG. 33 shows a schematic illustration of the reflective-type stereoscopic image display device depicted in Patent Document 3. Further, as shown in FIG. 32, a plurality of display units each having a pixel for displaying a right-eye image and a pixel for displaying a left-eye image are arranged in matrix in a display panel 2.

A lenticular lens 3 is disposed in the front of the display panel 2, and it has convex shapes formed repeatedly on its surface so as to have a function of distributing the light emitted from each of the pixels towards the left and right directions connecting between the pixel for displaying the left-eye image and the pixel for displaying the right-eye image within each of the display units (see FIG. 32 and FIG. 33). The reflection plate 4 reflects the external light towards the display panel, and the above-described uneven shapes 41 are formed on the surface of the reflection plate 4. A focal distance f of the lens is different from a distance HR between the surface of the reflection plate 4 and the vertex of the lens.

In the reflective-type stereoscopic image display device shown in FIG. 33, the light converged by the lenticular lens 3 has a specific dimension on the surface of the reflection plate 4. Thus, it is reflected at a plurality of kinds of tilt angles, e.g., reflected at the slopes, the flat parts, and the like of the uneven shapes, so that the reflected light travels towards directions at various angles. This makes it possible to prevent deterioration in the luminance that is caused by the uneven shapes. That is, this is a method which isolates the position of lens focal point from the position of the reflection plate to shift the focal point of the enlarged area so as to blur the distributed images. This technique is referred to as "defocus effect" in this Application hereinafter.

As described above, the theoretical contents of the above-described stereoscopic image display device and the reflective-type flat display device using the lenticular lens 2 are well known, and technical investigations of the reflective-type/transflective-type stereoscopic image display devices applying those also have actively been conducted in various related fields in these days.

The inventors of the present invention have eagerly conducted studies so as the achieve a display device capable of performing stereoscopic image display with reflective display and to achieve low power consumption by combining the above-described stereoscopic image display device and the reflective/transflective-type flat display device. As a result, new issues as follows have become apparent.

First, the reflective display area within the pixel in the reflective/transmissive type display panel is disposed at a constant position within each pixel for keeping the uniformity of the reflective display. Thus, in the display panel where the pixels are arranged in matrix, the reflective display areas are periodically arranged according to the periodicity of the pixel matrix. In particular, data lines, scanning lines, and the like are provided in the boundary areas between the neighboring pixels in many cases, so that those areas become non-reflective display areas. Further, when there are transistors (TFTs), light is shielded with the black matrix, thereby forming the non-reflective display areas.

Therefore, as shown in FIG. 34, for example, when an image distributing device such as a lens is disposed by corresponding to two pixels (left-eye pixel 51, right-eye pixel 52) of the display panel 2, there may be a viewing area from which the reflective display cannot be visually recognized if a non-reflective display area 70 within the pixel is enlarged. This results in deteriorating the visibility of the reflective display.

Further, when the reflection plates within the pixels are arranged regularly according to the pixel layout even if the reflective display areas are in the lens focal positions partially, the light passing through the pixels is separated to the image distributing directions. Thereby, display unevenness caused by the reflection plates is to be visually recognized only at a specific viewing position. In addition, the pixels are enlarge-displayed by the effect of the lens, so that the display unevenness may be enlarge-displayed as well.

That is, in a stereoscopy viewable area that is originally supposed to have uniform luminance, there may be generated an area with deteriorated luminance depending on the viewing positions. In that case, when the viewing position is changed, the display becomes dark at a position where the luminance is deteriorated, and a dark-line pattern may be observed in some cases. Further, the quality of the stereoscopic image is deteriorated because of the unevenness of the luminance.

In order to decrease the display unevenness, there is considered a method of blurring the distributed images by shifting the focal points of the enlarged areas (Patent Document 3). However, there are still following issues remained, even when the technique depicted in Patent Document 3 is applied. That is, the images become blurred since the focal points are shifted, even though the deterioration of the luminance is decreased by the defocus effect. Therefore, the image separating performance becomes deteriorated while blurring the image, so that the display quality of the stereoscopic image becomes deteriorated.

Further, when there is shift generated at the time of mounting the image distributing optical devices on the flat display panel, the focal point positions on the display elements are shifted from the designed layout. Thus, the defocus effect is greatly reduced. Furthermore, when there is deflection and thermal contraction generated in the image distributing optical device, it is not possible to obtain a uniform defocus effect on the plane. Therefore, the defocused images are displayed as unevenness, which largely deteriorates the display quality of the stereoscopic images.

SUMMARY OF THE INVENTION

An exemplary object of the present invention is to provide an image display device which can improve the display quality of stereoscopic images by effectively suppressing expansion of non-reflective display areas particularly in the display element areas used for displaying images so as to expand a viewable area and by suppressing deterioration of the reflection visibility, and to provide a terminal device utilizing the image display device.

In order to achieve the foregoing exemplary object, an image display device according to an exemplary aspect of the invention includes: a plurality of arranged display elements each including at least a pixel for displaying a first-viewpoint image and a pixel for displaying a second-viewpoint image, each of the pixels having a transmissive display area for transmitting light and a reflective display area for reflecting external light; and an optical device for distributing light emitted from each of the pixels to one and the other directions different from each other, wherein the reflective display areas of each of the display elements are arranged asymmetrically with respect to an arbitrarily set segment that is on a face of the respective pixel and passes the respective display element arranged in a direction orthogonal to an emission light distributing direction by the optical device.

In order to achieve the foregoing exemplary object, an image display device according to another exemplary aspect of the invention includes: a plurality of arranged display elements each including at least a pixel for displaying a first-viewpoint image and a pixel for displaying a second-viewpoint image, each of the pixels having a transmissive display area for transmitting light and a reflective display area for reflecting external light; data lines for supplying display data to each of the pixels; pixel switching devices for transmitting display data signals from the data lines to each of the pixels; gate lines for controlling the pixel switching devices; and an optical device for distributing light emitted from each of the pixels to different directions from each other along the extending direction of the gate lines, wherein: an action of a pixel pair disposed by sandwiching the gate line is controlled by the gate line disposed between the pixels; each of the pixels configuring the pixel pair is connected to a different data line; the pixel pair neighboring to each other in the extending direction of the gate line is connected to different gate lines; and the reflective display areas of each of the pixels are provided to cover the set positions of the pixel switching devices.

Further, in order to achieve the foregoing exemplary object, a terminal device according to still another exemplary aspect of the invention includes the above-described image display device mounted for display.

DETAILED DESCRIPTION OF THE EXEMPLARY EMBODIMENTS

First Exemplary Embodiment

A first exemplary embodiment of the invention will be described hereinafter by referring to FIG. 1-FIG. 6.

Figure 1:
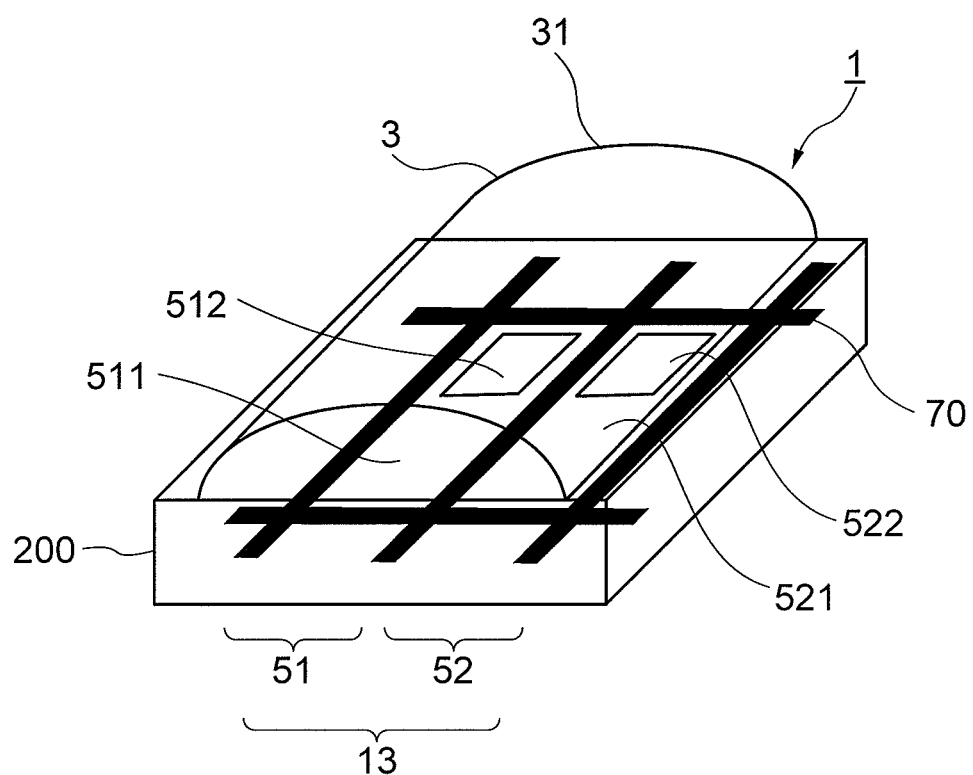
FIG. 1 is a schematic perspective view showing a part of a stereoscopic image display device according to a first exemplary embodiment of the invention.
Figure 2:
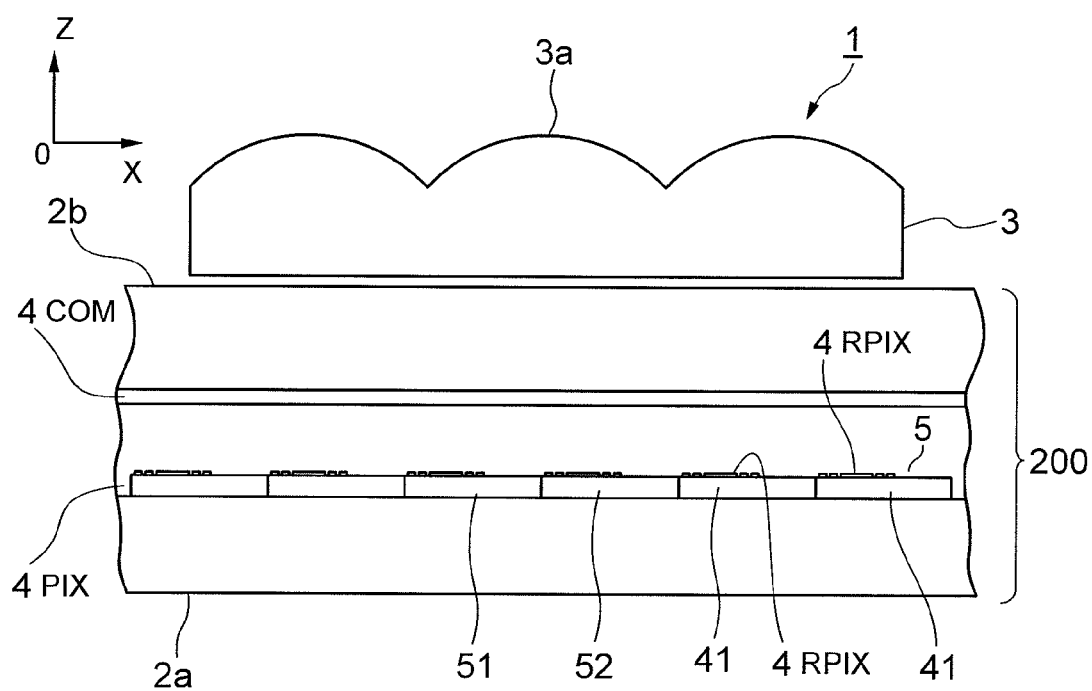
FIG. 2 is an explanatory illustration showing a part of a sectional structure including a liquid crystal part of the stereoscopic image display device disclosed in FIG. 1.
Figure 3:
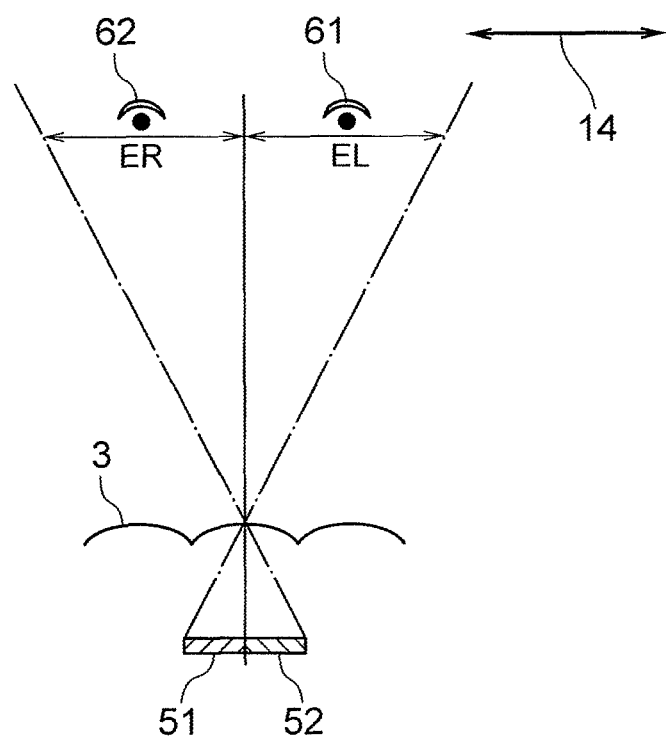
FIG. 3 is a conceptual diagram for showing the principle of the stereoscopic image display device disclosed in FIG. 1.
Figure 4:
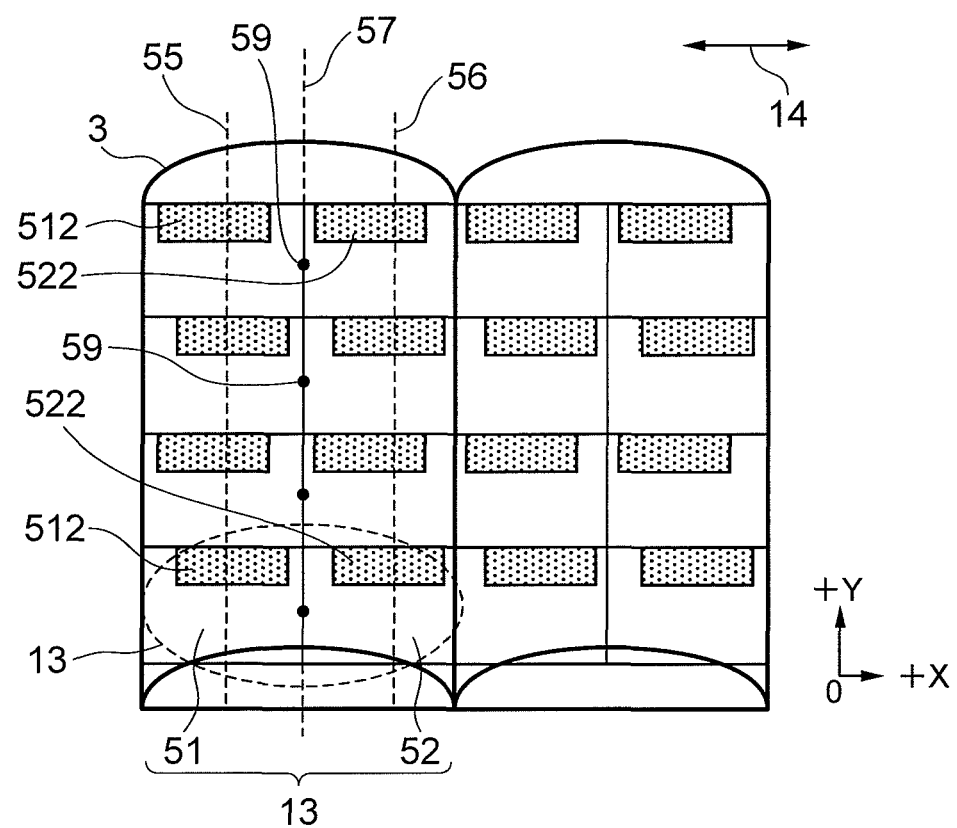
FIG. 4 is a top plan view showing a positional relation between pixel parts and distributing lens parts of the stereoscopic image display device disclosed in FIG. 1.
Figure 5:
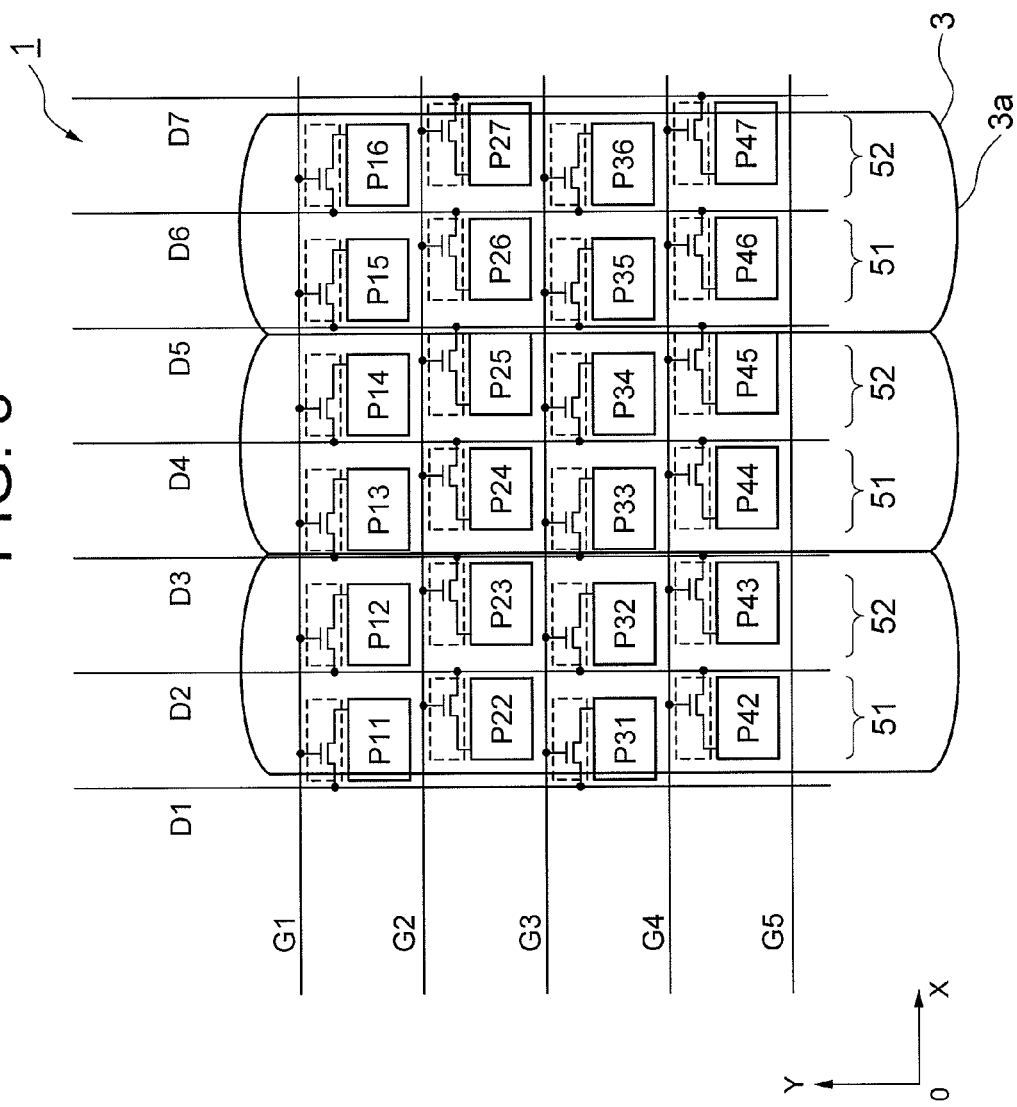
FIG. 5 is a model illustration showing layout of pixel transistors that are disposed by corresponding to the pixel parts of FIG. 4.
Figure 6:
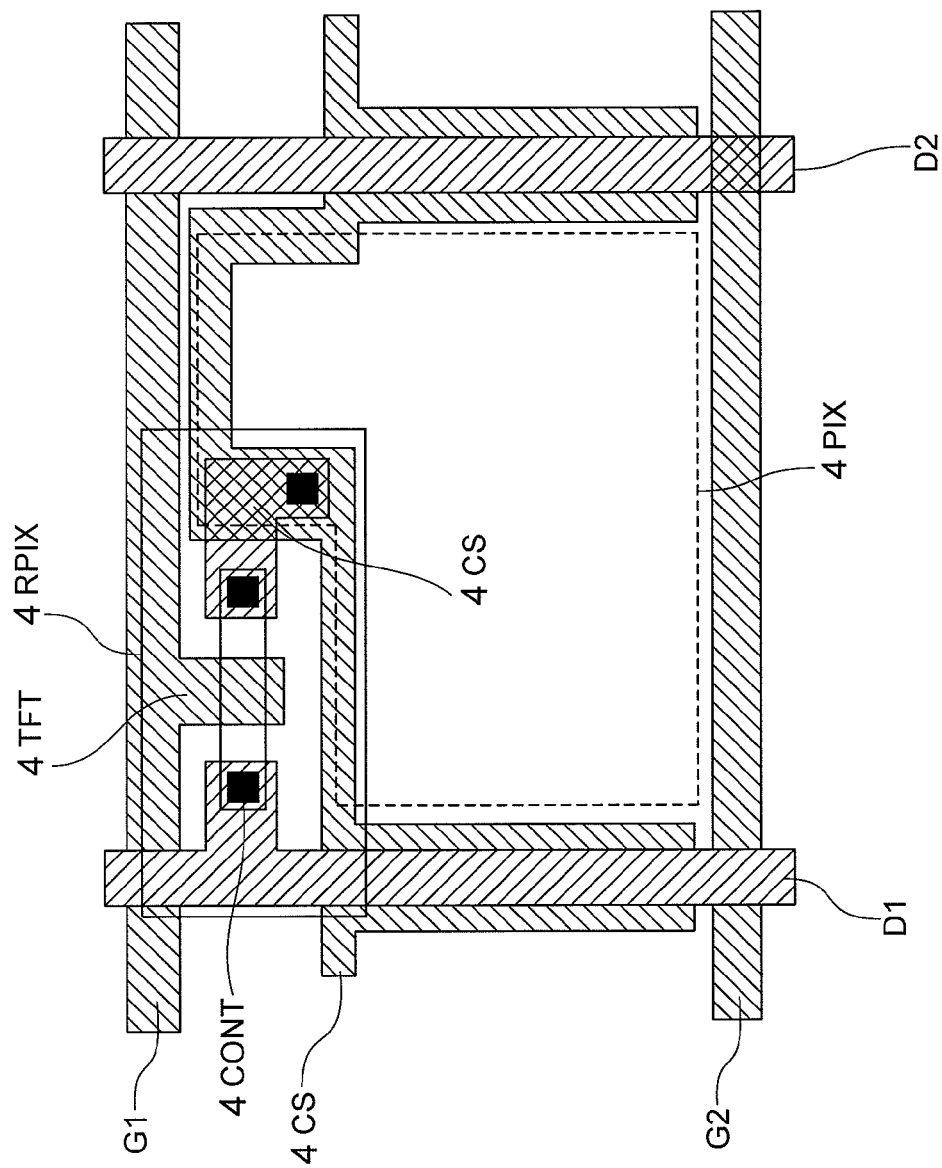
FIG. 6 is an enlarged explanatory view showing an example of each pixel part disclosed in FIG. 5.

FIG. 1 is a schematic perspective view showing display element parts of a stereoscopic image display device according to a first exemplary embodiment of the invention. FIG. 2 is a schematic sectional view showing an overall configuration of the stereoscopic image display device including the display element parts shown in FIG. 1. FIG. 3 is a conceptual diagram for showing the principle of the stereoscopic image display device according to the first exemplary embodiment including FIG. 2. FIG. 4 is a top plan view showing a part of the stereoscopic image display device including FIG. 2 of the first exemplary embodiment. FIG. 5 is a model illustration showing a layout example of transistors for driving pixels of the stereoscopic image display device according to the first exemplary embodiment including FIG. 4. FIG. 6 is a top plan view showing an example of the pixel parts of the first exemplary embodiment, which is a part of FIG. 5.

(Structure)

First, the basic structure of the first exemplary embodiment will be described. A stereoscopic image display device 1 in FIG. 1 has a lenticular lens 3 disposed on a viewer side. This lenticular lens 3 is stacked on a display panel 200. The display panel 200 is a transflective liquid crystal display panel, and it is basically configured with a TFT substrate 2a, a counter substrate 2b provided by opposing to the TFT substrate 2a, and a liquid crystal layer 5 provided between each of the substrates, as shown in FIG. 2.

Further, the above-described stereoscopic image display device 1 as an image display device includes a plurality of display elements each including a pixel 52 for displaying a first-viewpoint image and a pixel 51 for displaying a second-viewpoint image arranged on a same plane. Each of the pixels 51 and 52 has respective transmissive display areas 511, 521 for transmitting light and respective reflective display areas 512, 522 for reflecting external light. Furthermore, the lenticular lens 3 as an optical device (emission light distributing device), which distributes the light emitted from each of the pixels 51, 52 to one and the other directions that are different from each other by corresponding to each viewpoint position, is provided by corresponding to each display element 13 as described above.

Further, as shown in FIG. 4, each of the above-described reflective display areas 512 and 522 of each display element 13 is arranged asymmetrically with respect to an arbitrarily set segment that is on the face of each of the pixels and passes through each of the display elements 13 arranged in a direction orthogonal to the emitted light distributing directions by the lenticular lens (optical device) 3 e.g., a segment YG 57 that connects the center points 59 (may be the centers of the mass) of each of the display elements 13. Further, a segment YL 55 in parallel to the segment YG 57 is a common center line that passes the center points of each of the pixels 51, while a segment YR 56 in parallel to the segment YG 57 is a common center line that passes the center points of each of the pixels 52.

The first exemplary embodiment employs a method which arranges the reflective display areas 512 and 522 asymmetrically within the pixels 51 and 52. As a result, the non-reflective display areas (transmissive display areas) can be set wider (i.e., can utilize the non-reflective display area effectively), which makes it possible to expand the viewing area and to improve the display quality of the stereoscopic images at the same time.

As a plurality of display elements 13 arranged by corresponding to the above-described lenticular lens (optical device) 3, at least two kinds of display elements 13 or more which at least have different layout for in the reflective display areas 512 and 522 are used in the first exemplary embodiment. Among the display elements 13 where the layout of the reflective display area 512 or 522 is different, the display elements having the same-pattern reflective display area (for example, 512) are arranged periodically along an image distributing direction 14 (see FIG. 4). Further, the display elements 13 having different layout for the reflective display areas 512 and 522 are arranged neighboring to each other along a direction orthogonal to the image distributing direction 14.

Further, when at least two or more display elements 13 are stacked on one another and seen through, each of the display elements neighboring to each other in the direction along the above-described common center line YG 57 is arranged in such a manner that the reflective display areas 512 and 522 of each of the display elements 13 can increase the dimension of the reflective areas of each other for the emission light distributing direction, while compensating the part that has no reflective display area with the pixels neighboring to each other along the center line YG 57. Thereby, the reflective areas can reflect the light almost continuously towards the emission light distributing direction.

Further, within the sectioned area of each of the pixels 51 and 52, a driving circuit for controlling the display actions of each of the pixels 51 and 52 is provided. The reflective display areas 512, 522 of each of the pixels 51, 52 are disposed in the top face of the driving circuit. The driving circuit for each of the pixels 51 and 52 is configured with a switching circuit (pixel switching device) having a transistor 4TFT disclosed in FIG. 6 as the main part. Thus, the transmissive display areas 511 and 521 in each of the pixels P11, P12, P13, - - - shown in FIG. 5 are set still wider, so that still clearer image information can be sent out to the viewing area. Therefore, the exemplary object of the present invention mentioned above can be effectively achieved.

This will be described in more details hereinafter.

As described above, the lenticular lens 3 is disposed on the display panel 200. The lenticular lens 3 has a great number of curved surfaces (cylindrical faces) on which a convex part 31 appears at a constant pitch. This cylindrical face is disposed in such a manner that the convex part 31 corresponds to the display element that is configured with the left-eye pixel 51 and the right-eye pixel 52. Therefore, the display panel 200 has the display elements each configured with the left-eye pixel 51 and the right-eye pixel 52, and the display elements 13 are arranged in matrix as shown in FIG. 5.

Further, as shown in FIG. 2, a pixel electrode 4PIX and a reflective pixel electrode 4RPIX are provided on the surface of the TFT substrate 2a on the liquid crystal layer side, and a common electrode 4COM is formed on the surface of the counter substrate 2b on the liquid crystal layer side. The pixel electrode 4PIX and the common electrode 4COM are provided to the pixels 51, 52, the corresponding pixel electrode 4PIX and common electrode 4COM are selected by the scanning line, and the orientation of the liquid crystal is controlled by a voltage applied between the both so as to display an image. When achieving display with a transmissive mode, a backlight (BL: not shown) placed in the back-face side of the display panel 2 is illuminated, and the transmission light from the backlight is utilized to display an image.

Figure 31:
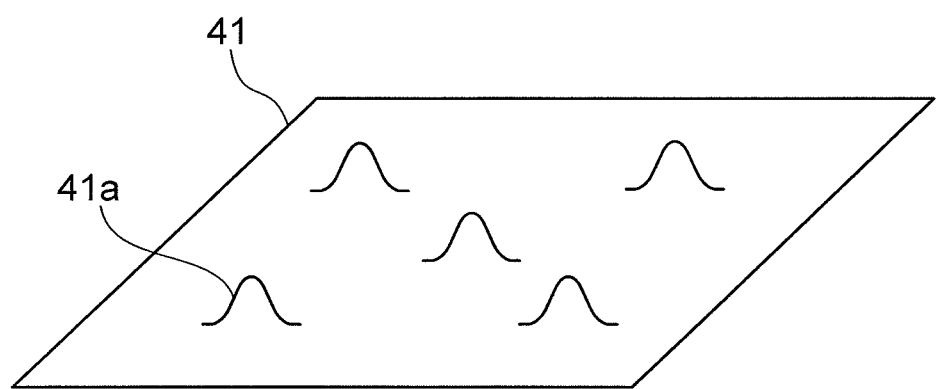
FIG. 31 is a conceptual diagram showing a reflection plate having uneven shapes according to a related technique.
Figure 32:
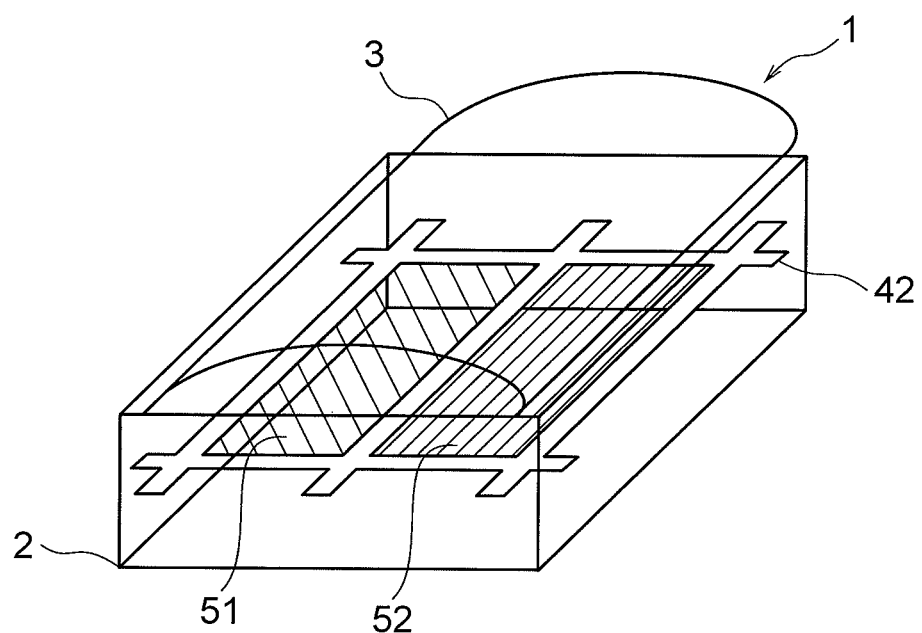
FIG. 32 is a perspective view showing an example of a stereoscopic image display device using a lenticular lens and display elements according to a related technique.
Figure 33:
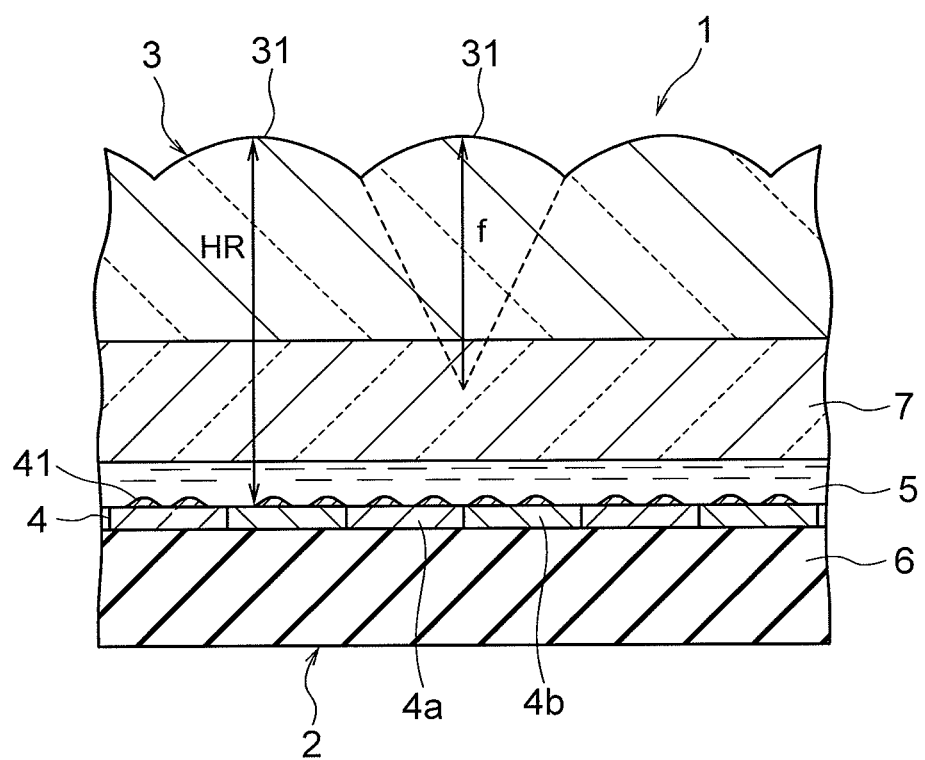
FIG. 33 is a sectional view showing a transflective stereoscopic image display device using a lenticular lens and transflective display elements according to a related technique.

In the first exemplary embodiment, a reflection plate 41 is disposed on the liquid crystal layer side of the TFT substrate 2a as described above. The reflection plate 41 has uneven shapes 41a similar to the uneven shapes 4a shown in FIG. 31, for example. The size of the uneven shape 41a is the same as the uneven shape of the reflection plate of a conventional reflective-type liquid crystal display device. As a way of example, a height of 2 μm and a pitch of 10 μm are employed. Further, since the gap of the reflective areas can be adjusted with the height of the uneven shape, the gap between the transmissive area and the reflective area can be optimized. This reflection plate 41 is disposed in each of the reflective display areas 512 and 522 for the right eye and the left eye to be described later. Further, the pixel electrode 4RPIX for the reflective area is provided on the top layer of the reflection plate 41, so that it is possible to drive the liquid crystal molecules of the reflective area.

Within the areas of each of the left-eye pixel 51 and the right-eye pixel 52, the right-eye reflective display area 512 and the left-eye reflective display area 522 as the areas for reflecting the light making incident from the outside the display device are provided. Further, the right-eye transmissive area 511 and the left-eye transmissive area 521 are provided as the areas for transmitting light. In the first exemplary embodiment, the dimensions of the right-eye reflective area 512 and the left-eye reflective area 521 are set to be the same so that the light amount of the reflected light making incident on the left and tight eyes becomes the same. Similarly, the dimensions of the right-eye transmissive area 511 and the left-eye transmissive area 521 are the same so that the images displayed with the transmissive mode become the same for the left and right eyes.

As described above, with the first exemplary embodiment, a single display element 13 is configured with a single left-eye pixel 51 and a single right-eye pixel 52. In each of the display elements 13, the light emitted from the left-eye pixel 51 and the light emitted from the right-eye pixel 52 is distributed towards the left eye and the right eye by a single cylindrical lens 3a that configures the lenticular lens 3.

In this case, external light transmits through the lenticular lens 3, the transparent substrate (counter substrate) 2b, and a liquid crystal layer 5, which is then reflected at the reflection plate 41 that is located on the lower face of the liquid crystal layer 5. The light again transmits through the liquid crystal layer 5, the transparent substrate 2b, and the lenticular lens 3. At this time, the external light making incident on the reflection plate 41 from a specific direction is diffusively reflected towards various directions by the uneven shapes 41a on the surface of the reflection plate 41, and it is also reflected towards the direction of the viewer. This makes it possible to prevent the reflection of the figure of the light source and to utilize the external light of various angles for display.

In each of the drawings of FIG. 1 and FIG. 2, XYZ Cartesian coordinate system (three-dimensional Cartesian coordinate system) is set as follows for convenience' sake. That is, in the direction towards which the left-eye pixels 51 and the right-eye pixels 52 are repeatedly arranged, the direction from the left-eye pixel 51 towards the right-eye pixel 52 is defined as +X direction, and the opposite direction thereof is defined as −X direction. The +X direction and the −X direction are generally referred to as the X-axis direction. Further, the longitudinal direction of the cylindrical lens is defined as the Y-axis direction.

Furthermore, the direction orthogonal to both the X-axis direction and the Y-axis direction is defined as the Z-axis direction. Regarding the Z-axis direction, a direction from the face where the left-eye pixel 51 or the right-eye pixel 52 is disposed towards the lenticular lens 3 is defined as +Z direction, and the opposite direction thereof is defined as −Z direction. The +Z direction is a front direction, i.e., the direction towards the user, and the user is to visually recognize the +Z side face of the display panel 200. The +Y direction is a direction that applies the right-hand coordinate system. That is, when the thumb of a right hand of a person points to the +X direction and the index finger points to the +Y direction, the middle finger is to point to the +Z direction.

When the XYZ Cartesian coordinates system is set to FIG. 1 and FIG. 2 as described above, the arranging direction of a single cylindrical lens 3a is the X-axis direction, so that the image for the left eye and the image for the right eye are to be separated along the X-axis direction. Further, the display elements 13 each configured with the left-eye pixel 51 and the right-eye pixel 52 are arranged in line along the Y-axis direction. The arranging period of the pixel pairs in the X-axis direction is almost the same as the arranging period of the cylindrical lenses. A line of the display elements 13 arranged along the Y-axis direction are arranged by corresponding to a single cylindrical lens 3a.

FIG. 4 shows a top plan view of the stereoscopic image display device 1. In the first exemplary embodiment, the arranging direction of the cylindrical lenses 3a is the direction along the X-axis, so that the X-axis direction is the image distributing direction 14. Further, regarding the left-eye pixels 51, the right-eye pixels 52, and the display elements 13, the center lines of each member (reflective display areas of each pixel, for example) provided along the Y-axis by being in parallel to the Y-axis are defined as a left-eye pixel central axis line YL 55, a right-eye pixel central axis line YR 56, and a display element central axis line YG 57, respectively. The shape of each of the cylindrical lenses 3a is in a cylindrical form extending in one direction so that the focal point is located on the central line YG 57 of the display element 13. For simplification, explanations are provided assuming that it is a two-dimensional space (two-dimensional face) when using the top plan view of the stereoscopic image display device.

The display panel 200 is an active-matrix type liquid crystal display panel having thin film transistors (TFTs). The thin film transistors work as switches for transmitting display signals to each pixel. The switches are operated by gate signals flowing in gate lines that are connected to gates of each switch. In the first exemplary embodiment, gate lines G1-G5 extended in the row direction (that is, the X-axis direction) are disposed in the face of the inner side (that is, the face of the +Z direction side) of the TFT substrate 2a (see FIG. 2). The gate lines G1-G5 are also referred to as gate lines G as a general term.

Further, data lines D1-D7 extending in the column direction (that is, the Y-axis direction) are disposed on the same face of the TFT substrate 2a. The data lines D1-D7 are also referred to as data lines D as a general term. The data lines function to supply display data signals to the thin film transistors. In the first exemplary embodiment, the gate lines G are extended along the X-axis direction, and a plurality of them are provided along the Y-axis direction.

Further, there are a plurality of data lines D arranged along the X-axis direction. Further, the pixel (left-eye pixel 51 or right-eye pixel 52) is disposed in the vicinity of the intersection point between the gate line and the data line. Particularly, in FIG. 5, the pixel connected to the gate line G3 and the data line D2 is marked as P32, for example, in order to clearly show the connecting relation of the pixel with respect to the gate line and the data line. That is, the numeral after "P" is the numeral applied after "G" for the gate line, and the numeral thereafter is the numeral after "D" for the data line.

Here, connecting relations regarding the gate lines, the data line, and each pixel will be summarized. In FIG. 5, pixels connected to the gate line G1 will be considered. According to the above-described rule, the pixel p11 is connected to the data line D1, and the pixel P12 is connected to the data line D2. In this manner, each of the pixels connected to the gate line G1 is connected to the data line that is neighboring to itself in the −X direction. This is also true for the odd-numbered gate lines such as the gate lines G3 and G5.

Next, pixels connected to the gate line G2 will be considered. The pixel P22 is connected to the data line D2, and the pixel P23 is connected to the data line D3. In this manner, each of the pixels connected to the gate line G2 is connected to the data line that is neighboring to itself in the +X direction. This is also true for the even-numbered gate line such as the gate line G4.

With the above-described structure, the image display device 1 according to the exemplary embodiment includes: data lines for supplying display data to each of the pixels; pixel switching devices for transmitting display data signals from the data lines to the pixels; and gate lines for controlling the pixel switching devices. At the same time, the pixel switching device is disposed in the vicinity of the intersection point between the gate line and the data line, the pixels are arranged in matrix, each of the pixels forming a row of the pixels is connected to a common gate line, and each of the pixels forming a column of the pixels is connected to different data lines.

In this exemplary embodiment, in particular, each of the pixels in the even-numbered row is connected to the data line disposed on the left side of the pixel, while each of the pixels in the odd-numbered row is connected to the data line disposed on the right side of the pixel.

FIG. 6 shows an enlarged view of the pixel P11 among the pixels P11, P12, P13, - - - disclosed in FIG. 5. The pixel thin film transistor 4TFT is a MOS-type thin film transistor, either a source electrode or a drain electrode is connected to the data line D via a contact hole 4CONT, while the other is connected to the pixel electrode 4PIX. Further, the reflection plate 41 (not shown) is provided to cover the pixel thin film transistor 4TFT, and the reflective-display area pixel electrode 4RPIX is provided on the reflection plate 41.

That is, on the liquid crystal layer side of the TFT substrate 2a located on the back-face side of the respective pixel within the sectioned area of each of the pixels P11, P12, P13, - - - , the driving circuit for variably controlling the display actions of the corresponding pixels P11, P12, P13, - - - are provided as described above. At the same time, the reflective display area of the respective pixels P11, P12, P13, - - - is provided on the top face of the corresponding driving circuit, and the reflection plate 41 is provided in the reflective display area. As the driving circuit (pixel switching device), the above-described transistor 4TFT is mounted as the main part. Thus, as shown in FIG. 6, the reflection plate and the TFT area are efficiently placed to overlap with each other in each of the pixels P11, P12, P13, - - - , and the transmissive display areas 511, 521 can be set still wider. Therefore, it is possible to send out still clearer and brighter image information to the viewing area. The above-described reflective-display area pixel electrode 4RPIX within each pixel is electrically connected to the pixel electrode 4PIX at the electrode end part.

In the first exemplary embodiment, it is defined to call the electrode to which the pixel electrode 4PIX or the reflective-display area pixel electrode 4RPIX is connected as a source electrode, and to call the electrode that is connected to the signal line (data line) D as a drain electrode. Further, the gate electrode of the pixel thin film transistor 4TFT is connected to the gate line G. In this exemplary embodiment, the gate electrode and the gate line G are on the same layer, so that those can be formed integrally. Further, a storage capacitance line 4CS forms a storage capacity (holding capacity) with the pixel electrode 4PIX and the data line D. The storage capacity (holding capacity) is a capacity for holding a data potential applied to the liquid molecules for a specific time. Furthermore, the common electrode 4COM is formed on the inner side of the counter substrate 2b, and a pixel capacitance 4CLC is formed between the pixel electrode 4PIX and the common electrode 4COM.

Further, although not shown, a light shielding layer for covering the part other than the opening parts of the pixels may be formed on the inner side of the counter substrate 2b. While an expression "light shielding part" is used in the first exemplary embodiment, this expression is not used to limit it particularly to the light shielding layer, but used to indicate a part that does not transmit light.

In FIG. 1-FIG. 6, the size and reduced scale of each structural element are changed as appropriate for securing the visibility (clarification) of the drawings. Further, the pixel structure is common for the left-eye pixel 51 and the right-eye pixel 52. Furthermore, in FIG. 5, the thin film transistor, the pixel electrode, and the reflection plate shown in FIG. 6 are omitted for clearly showing the connecting relations of each pixel with respect to the gate lines G1, G2, - - - and the data lines D1, D2, - - - .

A polysilicon thin film transistor using polycrystalline silicon as the semiconductor is used as the pixel thin film transistor 4TFT. An example of the polycrystalline silicon is a P-type semiconductor containing a slight amount of boron. That is, the pixel thin film transistor 4TFT is a so-called PMOS-type thin film transistor whose source electrode and drain electrode become conductive, when the potential of the source electrode or the drain electrode becomes lower-level than the potential of the gate electrode.

Here, an example of the procedure of forming the polysilicon thin film transistor will be described. First, an amorphous silicon layer is formed on the TFT substrate 2a after forming a silicon oxide layer (see FIG. 2) so as to form a polysilicon thin film by performing poly-crystallization of the amorphous silicon layer. An electrode material may be used for the polysilicon thin film. A polysilicon thin film layer that is electrically connected to the pixel electrode may be formed on the lower layer of the storage capacitance line to provide a storage capacitance (holding capacitance).

As a way to perform the poly-crystallization, heat annealing or laser annealing is used. Particularly, the laser annealing using a laser such as an excimer laser can perform polycrystallization only on the silicon layer by heating, while keeping the temperature increase of a glass substrate to the minimum. Thus, a nonalkali glass and the like having a low melting point can be used. This makes it possible to lower the cost, so that it is used often under a name of a low-temperature polysilicon. By omitting this annealing step, it is also possible to achieve an amorphous silicon thin film transistor.

Next, a silicon oxide layer as a gate insulating layer is formed on the silicon layer, and patterning is performed as necessary. In this process, it is desirable to dope ions in an area other than the part used as a semiconductor layer of the silicon thin film so as to make that area conductive. As a method for patterning, it is possible to apply an optical patterning method which uses a photosensitive resist. For example, after spin-coating the photosensitive resist, light is partially irradiated by an exposure machine such as a stepper. After going through a development step, the photoresist film is remained only in the part to keep the pattern. Thereafter, the silicon layer in the area where no photosensitive resist remains is eliminated by dry-etching or the like, and the photosensitive resist film is exfoliated at last.

Thereafter, an amorphous silicon layer and a tungsten silicide layer to be the gate electrode are deposited so as to form the gate electrode and the like. At this time, the gate line to which the gate electrode is connected and the storage capacitance line may also be formed as well. Then, a silicon oxide layer and a silicon nitride layer are formed, and patterning is performed as necessary. Thereafter, an aluminum layer and a titanium layer are deposited to form the source electrode and the drain electrode. At this time, the data line may also be formed simultaneously.

Then, a silicon nitride film is deposited, and patterning is performed as necessary. Thereafter, a transparent electrode such as ITO is deposited, and it is patterned to form the pixel electrode. Thereby, the pixel structure having the thin film transistor can be formed. By using this thin film transistor, the circuit for driving the gate line, the data line, and the storage capacitance line can also be formed at the same time.

FIG. 6 shows a single pixel part of the first exemplary embodiment that is disclosed in FIG. 5 as described above. In the first exemplary embodiment, the gate line G and the storage capacitance line CS are formed with the same layer as that of the gate electrode of the thin film transistor 4TFT.

Further, as show in FIG. 4, regarding the pixel of this exemplary embodiment, the left-eye reflective display area 512 is arranged asymmetrically with respect to the central axis-line YL 55 of the left-eye pixel 51. Meanwhile, the right-eye reflective display area 522 is arranged asymmetrically with respect to the central axis line YR 56 of the right-eye pixel 52. Further, the left-eye reflective display area 512 and the right-eye reflective display area 522 are arranged asymmetrically with respect to the central axis line YG 57 of the display element 13. "Asymmetrically" herein means that there is no axis (mirror plane) of line symmetry.

Further, in FIG. 4 described above, the display elements 13 neighboring to each other in the +Y direction are arranged repeatedly by having two display elements as one period. The reflective display areas of the display elements 13 neighboring to each other in +Y direction are arranged by being inverted from each other with respect to the central axis line YG 57. In other words, each of the central axis line YL 55 of the left-eye pixel 51, the central axis line YR 56 of the right-eye pixel 52, and the central axis line YG 57 of the display element 13 is a glide plane (g) for the reflective display area.

The glide plane (g) is one of the symmetry elements in a space group. After performing a mirror operation regarding a plane (mirror plane) of a certain unit cell, a translation operation of one half or one quarter of the length of the unit cell is continuously performed in parallel to the mirror plane. If the unit cell is the same as the original unit cell after this operation, this plane is referred to as the glide plane (g). The glide plane (g) is a plane perpendicular to the surface of the paper. This applies not only for a three-dimensional space group but also for a two-dimensional space group. The top plan views of the pixel matrix in this Application are assumed to belong to a two-dimensional group. The reflective display area within the pixel of this exemplary embodiment at least exhibits a symmetry that is expressed as "pg" in the international symbols.

As shown in FIG. 2, both ends on the left and right sides of the reflective display area in this first exemplary embodiment are arranged by being isolated from the end part of the pixel. The data line and the TFT (thin film transistor) are provided between the reflective display areas neighboring to each other in the +X direction, and those are shielded from light with a black matrix. That is, in the first exemplary embodiment, the gap of the reflection plates in the +X direction is a non-reflective display area that is the same as the non-reflective display area 70 of the conventional case (FIG. 34) described above.

(Operations)

Next, operations and the like of the first exemplary embodiment will be described.

First, as shown in FIG. 1, the cylindrical lens 3a as a unit that configures the lenticular lens 3 is arranged to correspond to two pixels (the left-eye pixel 51, the right-eye pixel 52) of the display panel 200. As shown in FIG. 3, the light from the left-eye pixel 51 or the right-eye pixel 52 of the display element 13 is refracted by the lenticular lens 3 and emitted to each area EL or ER.

Therefore, when the viewer locates the left eye 61 in the area EL and the right eye 62 in the area ER, an image for the left eye is inputted to the left eye 61, while an image for the right eye is inputted to the right eye 62. Thereby, the viewer can recognize stereoscopic images.

Figure 35:
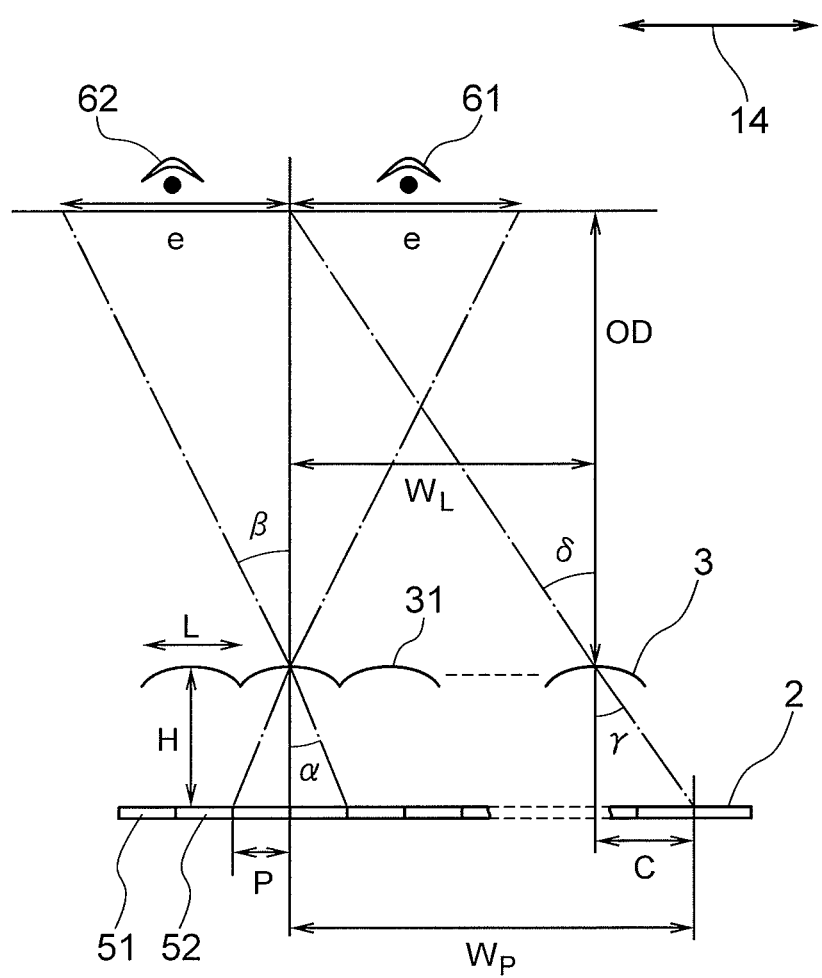
FIG. 35 is an optical model diagram showing sizes of each part of a stereoscopic image display device 1 using a lenticular lens.

Next, sizes of each part of the stereoscopic image display device 1 using the lenticular lens 3 will be described by using an optical model shown in FIG. 35. It is so defined that a distance between a convex part center 31 on the surface of the lenticular lens 3 and the display pixel 51 (52) is H, and the refractive index of the lenticular lens 3 is n. The convex part center 31 on the surface of the lenticular lens 3 means the vertex of the lenticular lens 3. It is also assumed that one face of the lenticular lens 3 is a plane, and a great number of convex cylindrical lenses (i.e., cylindrical convex parts 31 extending along one direction) are arranged on the other face.

The focal distance of the lenticular lens 3 is defined as f, and the lens pitch is defined as L. For the pixels of the display element 13, one each of the left-eye pixel 51 and the right-eye pixel 52 are arranged as a pair. The pitch between each of the pixels is defined as P. A pair of one each of the two pixels, i.e., the left-eye pixel 51 and the right-eye pixel 52, corresponds to a single convex part 31. Further, the distance between the lenticular lens 3 and the viewer is defined as OD (=S), and the enlarged projection widths of the pixels at the distance S, i.e., the widths of the projected images of the left-eye pixel 51 and the right-eye pixel 52 on a virtual plane that is in parallel to the lens and away from the lenticular lens 3 by the distance S, are defined as e, respectively.

Further, the distance from the center of the convex part 31 positioned in the center of the lenticular lens 3 to the center of the convex part positioned at the edge of the lenticular lens 3 is defined as $W_L$, and the distance from the center of the pair of the left-eye pixel 51 and the right eye pixel 52 positioned in the center of the display element 13 to the center of the pixel pair positioned in the edge part of the display element 13 is defined as $W_P$. Furthermore, the incident angle and the exit angle of the light with respect to the convex part 31 positioned in the center of the lenticular lens 3 are defined as α and β, respectively, and the incident angle and the exit angle of the light with respect to the convex part 31 positioned in the edge part of the lenticular lens 3 are defined as ν and γ, respectively. The difference between the distance $W_L$ and the distance $W_P$ is defined as C, and the number of pixels included in the area of the distance $W_P$ is defined as $2m$.

Normally, the lenticular lens 3 is loaded in accordance with the display element 13, so that the arranging pitch P of the pixels is taken as the constant. Further, the refractive index n is determined depending on the selection of the material for the lenticular lens 3. In the meantime, desired values are set for the observing distance S between the lens and the observer, and the width e of the pixel enlarged projection images at the observing distance S. The distance H between the lens face and the pixel as well as the lens pitch L is determined by using those values. Following Expressions 1-6 apply, according to Snell's law and geometrical relations. Further, each of following Expressions 7-9 applies as well.

$n \cdot \sin α = \sin β$ [Expression 1]

$S \cdot \tan β = e$ [Expression 2]

$H \cdot \tan α = P$ [Expression 3]

$n \cdot \sin γ = \sin δ$ [Expression 4]

$H \cdot \tan γ = C$ [Expression 5]

$S \cdot \tan δ = W_L$ [Expression 6]

$W_P - W_L = C$ [Expression 7]

$W_P = 2mP$ [Expression 8]

$W_L = mL$ [Expression 9]

Based on Expressions 2, 1, and 3 mentioned above, each of following expression 10, 11, and 12 applies.

$β = \arctan(e/S)$ [Expression 10]

$α = \arcsin[(1/n) \cdot \sin β]$ [Expression 11]

$H = P/\tan α$ [Expression 12]

Further, following Expression 13 applies based on Expression 6 and Expression 9 mentioned above. Furthermore, following Expression 14 applies based on Expression 7-Expression 9 mentioned above, and following Expression 15 applies based on Expression 5 mentioned above.

$α = \arctan(mL/S)$ [Expression 13]

$C = 2mP - mL$ [Expression 14]

$γ = \arctan(C/H)$ [Expression 15]

As shown in following Expression 16, normally, the distance H between the convex part center on the surface of the lenticular lens and the pixel is set equal to the focal distance f, so that the radius curvature r of the lens can be found by Expression 17.

$f = H$ [Expression 16]

$r = H \cdot (n-1)/n$ [Expression 17]

Effects of First Exemplary Embodiment

Figure 34:
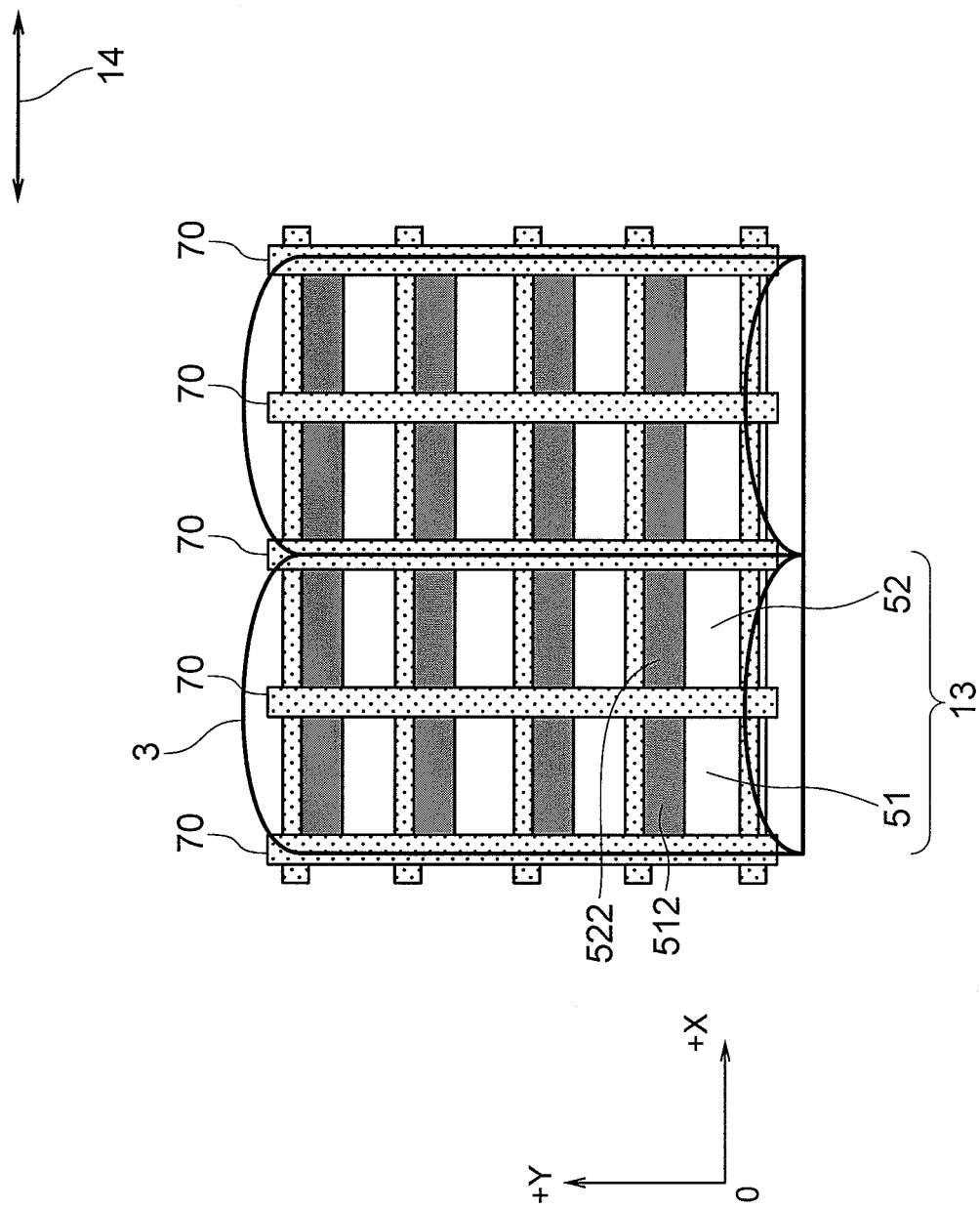
FIG. 34 is a top plan view showing a transflective stereoscopic image display device using a lenticular lens and transflective display elements according to a related technique.

With the above-described conventional case, when the image distributing device such as the lens is disposed by corresponding to the two pixels (left-eye pixel, right-eye pixel) of the display panel as shown in FIG. 34, there is generated an observing area where the reflective display cannot be recognized visually when the non-reflective display area (transmissive display area) within each of the pixels 51 and 52 is enlarged. This results in deteriorating the visibility of the reflective display. In the meantime, as shown in FIG. 4, regarding the layout of the reflective display areas of the first exemplary embodiment, the reflective display areas of the two display elements neighboring to each other in the direction perpendicular to the image distributing direction 14 are shifted from each other in the +X direction. Thus, it is possible to compensate the reflective display areas that are neighboring to each other in the +Y direction. That is, with the first exemplary embodiment, the two display elements 13 neighboring to each other in the direction that is perpendicular to the image distributing direction 14 can have the left and right reflective display areas by compensating the left-eye reflective display areas 512 and the right-eye reflective display areas 522, respectively. This effect is referred to as "neighboring pixel compensating effect" hereinafter.

Therefore, it is possible to prevent the non-reflective display areas (transmissive display areas) from being enlarged by the lens. Further, it is possible to provide a high-quality reflective display that exhibits no partial deterioration in the luminance regardless of the viewing positions. Furthermore, since the reflective display areas can be arranged with high efficiency because there is a great versatility of designing, it is possible to provide an image display device of high reflectance and fine visibility.

With the first exemplary embodiment, it is possible to set the defocus amount smaller than the conventional cases due to the above-described neighboring pixel compensating effect, thereby making it possible to improve the image separating performance. Further, the focal point positions are scattered at least to two kinds of reflective display areas. Thus, reflective display unevenness caused due to the shift generated when mounting the lenticular lens 3 can be decreased, thereby improving the yield.

The display elements 13 may be arranged in colors of red (R), green (G), and blue (B) in the +Y direction. When arranged in RGB, the three display elements arranged in RGB are taken as one unit, and the unit is referred to as "display pixels". In the first exemplary embodiment, the display device has lateral stripes of RGB. This makes it possible to provide a high-quality color display.

Further, for the display pixels of the first exemplary embodiment, RGB are arranged in order. In this case, the three display elements are the unit of "display pixels". That is, regarding the left-eye and right-eye pixels, six pixels are the unit of the "display pixels". With a single "display pixel" alone, the RGB reflective display areas reflect the light in a deviated manner, so that the colors of the reflected components cannot be compensated completely. However, it is possible to compensate the colors by the neighboring pixel compensating effect by using the two neighboring "display pixels" for compensation. Therefore, it is possible to provide a high-quality color stereoscopic image display device with small color changes generated in the reflective display.

That is, the neighboring pixel compensating effect is not only capable of compensating the pixels that are neighboring to each other, but also capable of compensating pixels that are adjacent to each other. The pixels compensating with each other in the +Y direction may be arranged by every two pixels or three pixels, as long as those pixels are disposed by corresponding to the color display pixels.

Further, the non-reflective display area may be remained as an opening part without providing the data wiring, TFT, and the black matrix. The transmittance can be increased by securing a larger opening area. With this, the light amount from the backlight can be decreased, which makes it possible to lower the power consumption.

With the stereoscopic image display device of the first exemplary embodiment structured in the manner described above, the transmissive display area can transmit the light from the backlight source, and the reflective display area can reflect the natural light and the external light such as room light. Therefore, the transmissive display and the reflective display can both be achieved. As a result, a clear display can be achieved regardless of the degrees of the brightness of the surroundings.

As described, the first exemplary embodiment employs the followings as the basic configuration. That is, it is an image display device, which includes: a plurality of display elements 13 each including the pixel for displaying the first viewpoint image and the pixel for displaying the second viewpoint image; the pixels 51 and 52 having the transmissive display areas 511, 521 for transmitting light and reflective display areas 512, 522 for reflecting external light; and an optical device (lenticular lens 3) which distributes the light emitted from the pixels 51 and 52 to different directions from each other, wherein the reflective display areas 512 and 522 within the display unit are arranged asymmetrically with respect to the axis that is perpendicular to the image distributing direction.

Therefore, with the first exemplary embodiment, the reflection plate and the image distributing device (optical device) are so structured to reduce the influence of the break in the reflection plate in the lens arranging direction. The reflection plates are arranged to be asymmetrical with respect to the Y axis in each of the pixels 51 and 52, and arranged to be symmetrical with respect to the Y axis in each of the display units. With this, the reflection plate 41 within the display unit can be arranged by being scattered for each of the display units that are arranged in the Y axis direction, so that the influence of the break in the reflection plates can be reduced. Even if there is a break, it is possible to improve such condition by shifting the focal point of the lens.

Further, it is the feature of the first exemplary embodiment that the display device is configured with at least two kinds of display elements 13 having different layout of the reflective display areas, and each of the display elements 13 is arranged periodically along the direction that is perpendicular to the image distributing direction 14. With this, the reflection plate 41 within the display unit can be located in a scattered manner for each of the display units that are arranged along the Y-axis direction, so that the influence of the break in the reflection plates can be reduced.

(Others)

The first exemplary embodiment has been described by referring to the case of the transflective display elements. However, the present invention can also be applied to cases of using slight-transmissive type display elements, cases of using slight-reflective type display elements, and the like.

Furthermore, while the first exemplary embodiment has been described by referring to the case of using the transflective liquid crystal display element, the present invention is not limited only to such case. It is also possible to use a reflective-type display panel. With the reflective-type display panel, the reflective display areas can be set larger (wider), so that the reflectance can be improved. Further, wirings and circuits can be provided to the parts used for the transmissive display areas, which improves the performance of the panel. Specifically, reflective display may be achieved by a front light through providing a light on the viewer side of the stereoscopic display device. With this, high-quality images can be provided even in places where the amount of external light is small. Even in cases where the reflective-type display panel is employed, the neighboring pixels can compensate with each other. This makes it possible to provide high-quality stereoscopic images with high effective reflectance.

Further, the lenticular lens 3 may be an easily-detachable thin lens sheet. With this, the lenticular lens 3 can be detached when displaying images that are not necessary to be displayed in stereoscopic images. When the lens is detached, images can be displayed with double-density definition. Thereby, the display device can be used as a high-definition and high-quality display panel. Furthermore, the first exemplary embodiment has been described by referring to the case of using the lenticular lens as the optical device (emission light distributing device) which distributes the light emitted from each of the pixels to different directions (one and the other) from each other by corresponding to each of the viewpoints. However, a fly-eye lens may be used instead.

Further, since the image display device 1 of the first exemplary embodiment uses the lenticular lens 3, there is no black stripe pattern generated in the image display that may be caused due to the barrier when a parallax barrier is used. Therefore, light loss is small.

The explanations above have been described by referring to the case of providing two viewpoints for observing the images. However, the present invention is not limited only to such case. The same effects can be obtained even when the image display device is formed to have multi viewpoints of three or more.

The display element 13 of the first exemplary embodiment may have the reflection plate 41 with the uneven shapes in the pixel electrode. That is, while the first exemplary embodiment has been described by referring to the case of using the transflective liquid crystal display element, the present invention is not limited only to such case. For example, it is possible to use a display element that utilizes the electrophoresis phenomenon. Further, regarding the uneven shape, the overall shape may be of any types such as dot type, bar type, dent type, as long as it has a structure having a slope. Furthermore, for the driving method of the pixel electrode, an active matrix method such as a TFT method or a TFD method can be used. A passive matrix method such as an STN method may also be applied.

For the reflective-area pixel electrode 4RPIX, the reflection plate 41 may be applied as the electrode. In that case, the number of processes can be decreased.

The present invention employs a method which disposes the reflective display areas asymmetrically with respect to an arbitrarily set segment that passes each of the display elements. Thereby, the present invention can provide the excellent image display device and the terminal device capable of achieving effective utilization of the transmissive display areas, expanding the viewable areas, and improving the display quality of the stereoscopic images at the same time, which are not possible with the conventional techniques.

Modification Example 1

Figure 7:
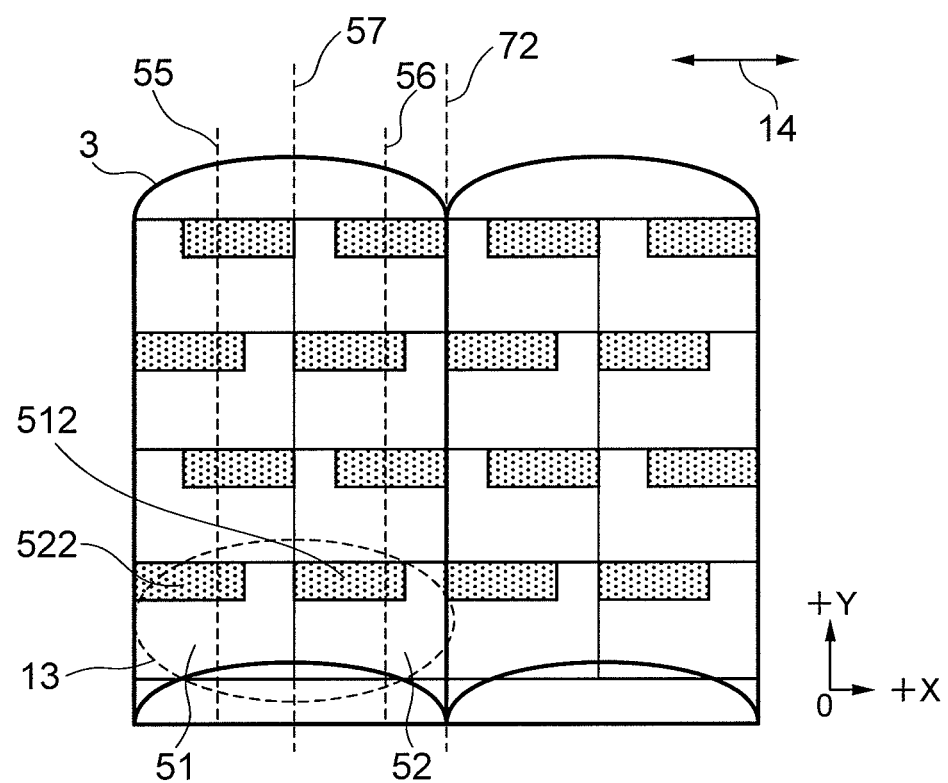
FIG. 7 is a model illustration showing layout of the structural contents of display element parts according to Modification Example 1 of the first exemplary embodiment.

Next, Modification Example 1 of the above-described first exemplary embodiment will be described by referring to FIG. 7. FIG. 7 is a model illustration showing a modification example of the display element 13 of the first exemplary embodiment.

In FIG. 7, the left and right reflection plates of the display element 13 are arranged to be asymmetrical with respect to the left-eye central axis line YL 55, the right-eye central axis line YR 56 within the pixels 51, 52, and the central axis line YG 57 of the display element 13 as in the case of FIG. 1. At least a part of the reflective areas of the left and right pixels 51 and 52 is in contact with the central axis line YG 57 of the display element 13. When the reflective display areas are compensated with each other by the neighboring pixels, the reflective display areas are continued in the +X direction without having a break on the central axis 57 of the display element. That is, in this Modification Example, each of the display elements 13 neighboring to each other in the direction along the above-described common center line YG 57 is arranged in such a manner that the reflective display areas 512 and 522 of each of the display elements 13 continue without a break for the emission light distributing direction, when at least two or more display elements 13 are stacked on one another and seen through. Further, there is no break generated in the reflective areas of a groove part 72 of the lenticular lens 3 away from the central axis line YG 57, so that the reflective areas continue in the +X direction.

In Modification Example 1 of the first exemplary embodiment, scanning lines are provided in parallel to the image distributing direction 14, and data lines are provided to the longitudinal direction of the lenticular lens. Further, the data lines, the scanning lines, and TFTs (transistors) are disposed under the reflective display areas. Thus, the reflection plate 41 is stacked at least on a part of the data lines. Other structures are the same as those of the first exemplary embodiment described above.

With Modification Example 1 shown in FIG. 7, there is no break generated in the reflective areas when the two display elements 13 neighboring to each other in the +Y direction are stacked on one another, so that there is no part to be non-reflective display area along the +X direction. Thus, reflective display can be provided with a more uniform luminance distribution. Further, since the defocus amount can be set still smaller due to the uniform luminance distribution, the stereoscopic image separating performance can be improved. This makes it possible to provide high-quality stereoscopic images. Other structures and the operational effects are the same as those of the first exemplary embodiment described above.

Modification Example 2

Next, Modification Example 2 of the above-described first exemplary embodiment will be described by referring to FIG. 8 and FIG. 9.

Figure 8:
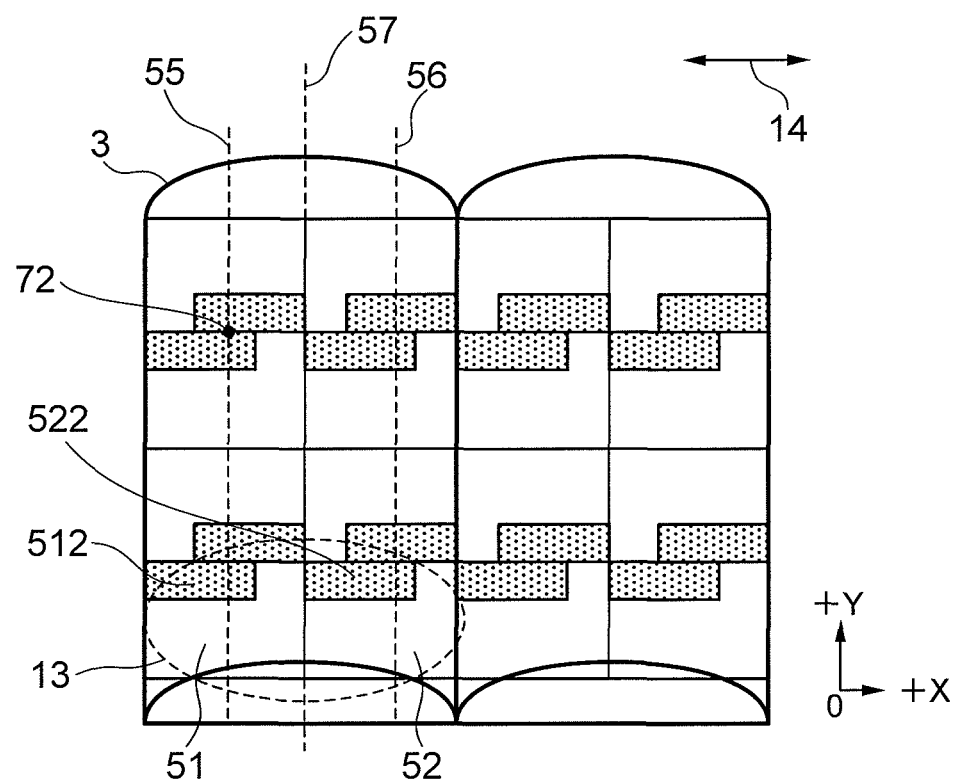
FIG. 8 is a model illustration showing layout of the structural contents of display element parts according to Modification Example 2 of the first exemplary embodiment.

FIG. 8 is a model illustration showing a modification example of the display element 13 of the first exemplary embodiment. Further, FIG. 9 is a top plan view showing layout of TFTs of the stereoscopic image display device 1 according to Modification Example 2. In FIG. 9, reference numeral 4G indicates a gate line for gate signals, and reference numeral 4D indicates a data line.

As shown in FIG. 8 mentioned above, the reflective display areas 512 and 512 of the two display elements 13 that are neighboring to each other in +Y direction (upper direction on the paper face of FIG. 8) are arranged to be point symmetrical with respect to the intersection point 72 on the central axis line YR 55 of the pixel 51. That is, the reflective display area 512 is equivalent when it is rotated by 180 degrees with respect to the center point 72. This is the same for the reflective display area 522 of the pixel 52.

In this Application hereinafter, the point at which the display area becomes equivalent when being rotated by 180 degrees is referred to as "twofold rotational symmetry axis". Accordingly, the reflective display areas 512 and 522 of Modification Example 2 are arranged by having the twofold rotational symmetry axis. It can be expressed as exhibiting symmetry of at least "p2" according to the international symbols of the two-dimensional space group.

The dimensions of the reflective display areas in each of the pixels 51 and 52 are the same, and the reflective areas of the display elements 13 that are neighboring to each other in the +Y direction have a part in contact with each other. Other structures are the same as those of Modification Example 1 (see FIG. 7) described above.

Figure 9:
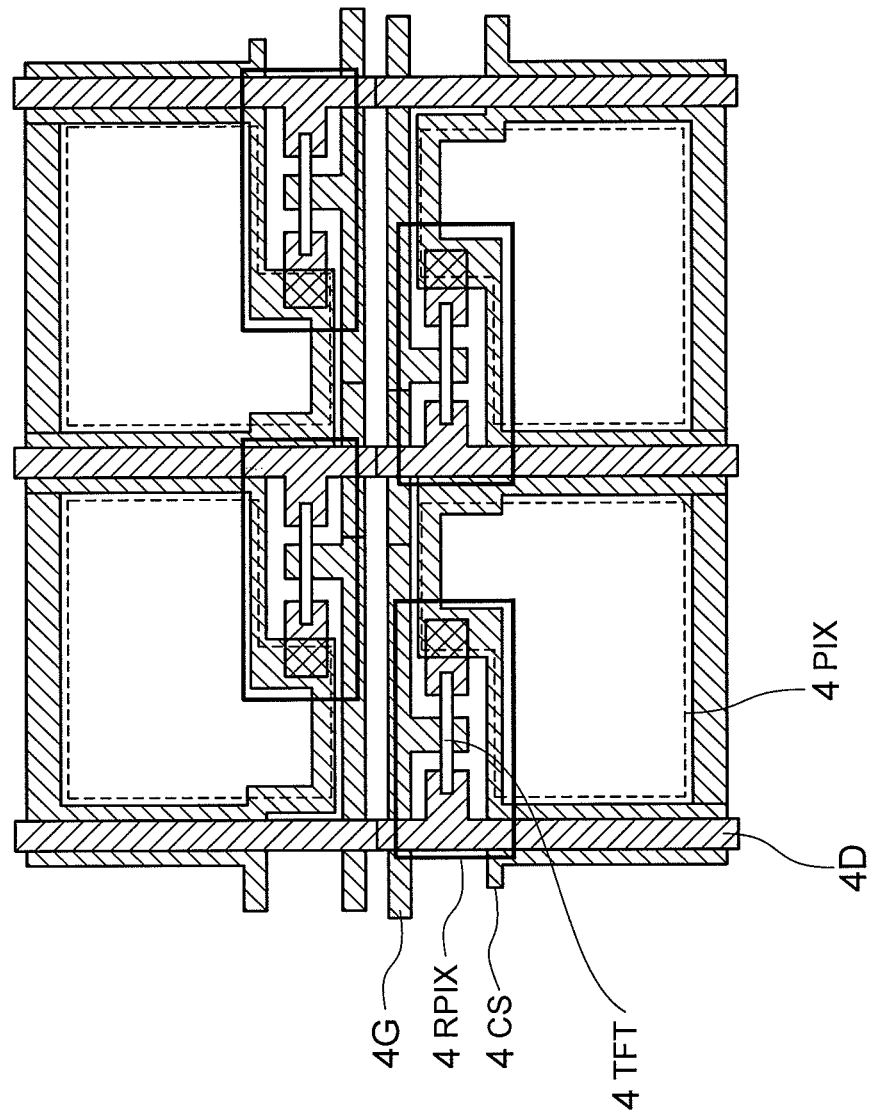
FIG. 9 is a model illustration showing a layout condition of TFTs of display element parts according to Modification Example 3 of the first exemplary embodiment.

With Modification Example 2 of the first exemplary embodiment, as shown in FIG. 9, the data lines and scanning lines may be provided under the reflective display areas. This makes it possible to shield the transmission light leaked from the gap of the wirings. Further, TFTs (thin film transistors) may be provided under the reflective areas. Through forming the reflective display areas on the transistors, light making incident from the outside the panel can be shielded. This makes it possible to reduce the light leakage and to improve the reliability.

At the same time, as shown in FIG. 8 and FIG. 9, the reflective display areas 512 and 522 of the neighboring display elements 13 are in contact with each other, thereby making it possible to secure a large dimension of the reflective display areas. Therefore, it is possible to have a large numerical aperture by efficiently arranging the TFT, the scanning line, and the data line under the reflective display area in a concentrated manner.

Further, due to the layout of the reflective display areas 512 with the twofold rotational symmetry, it is possible to provide the uniform reflective display that is the same as the original state, even when the display device is rotated by 180 degrees within the display plane. Therefore, this structure can be preferably applied to a portable device whose display screen can be rotated by 180 degrees or more, a swivel portable telephone, and a video camera whose monitor screen can be rotated.

Other structures and operational effects are the same as those of the first exemplary embodiment described above.

Second Exemplary Embodiment

Structure

Next, a second exemplary embodiment of the invention will be described by referring to FIG. 10-FIG. 12.

Figure 10:
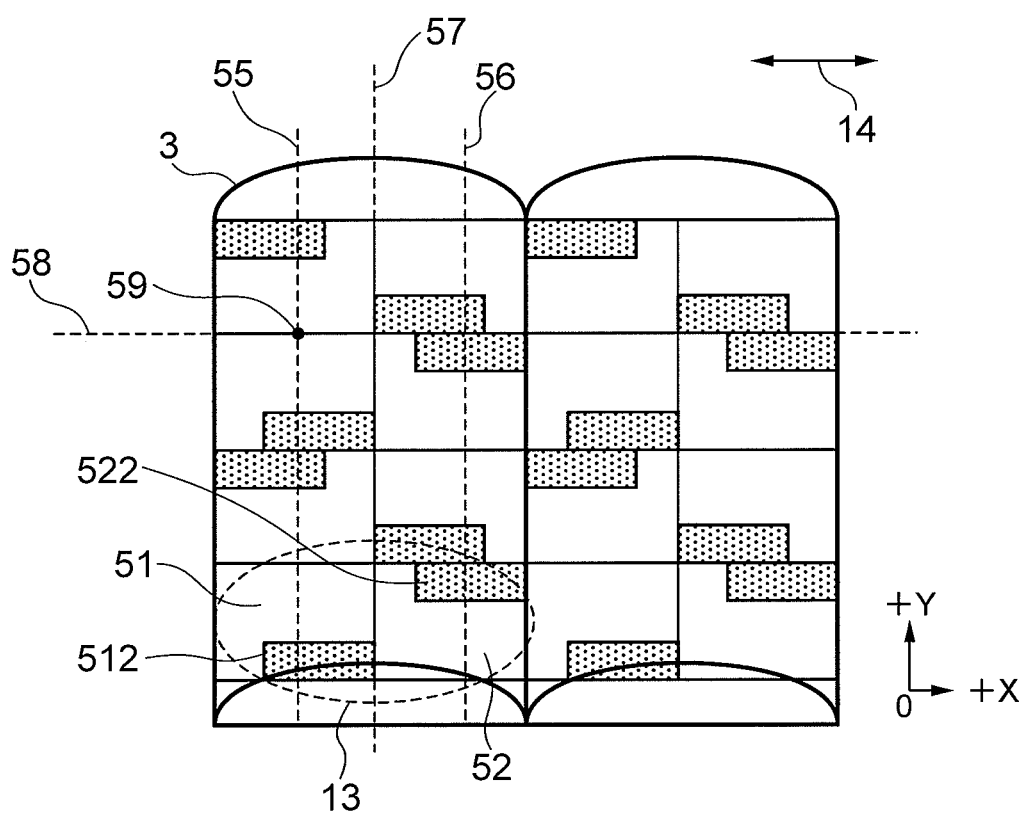
FIG. 10 is a top plan view showing a part of a stereoscopic image display device according to a second exemplary embodiment of the present invention, which is a model illustration showing layout of the structural contents of the display element parts.
Figure 11:
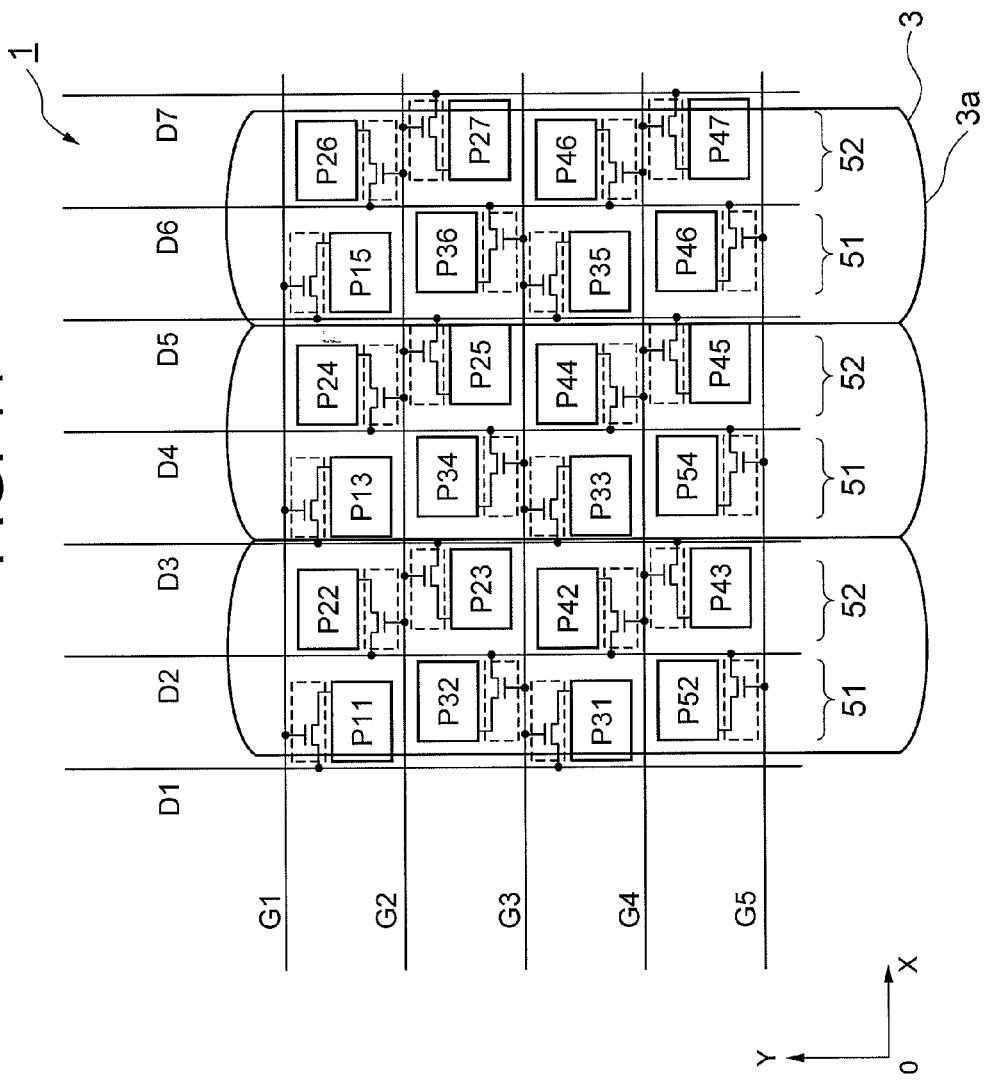
FIG. 11 is a model illustration showing layout of pixel transistors disposed by corresponding to the pixel parts of FIG. 10.
Figure 12:
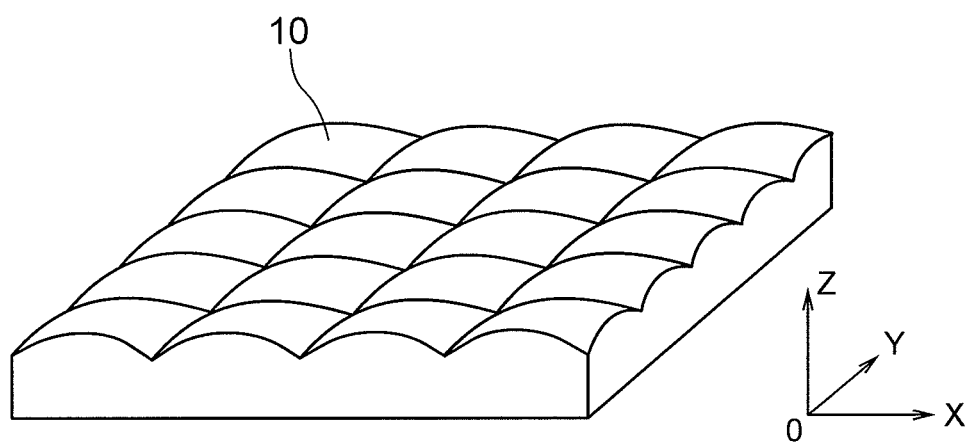
FIG. 12 is a perspective view showing a fly-eye lens used instead of a lenticular lens.

FIG. 10 is a top plan view showing a stereoscopic image display device according to the second exemplary embodiment, and FIG. 11 is a model illustration showing layout of pixel transistors. Further, FIG. 12 is a perspective view showing a fly-eye lens that is used instead of the lenticular lens.

First, in FIG. 10, the reflective display areas 512 and 522 disposed within the display elements neighboring to each other on the left and right sides are formed with reflection plates that are arranged by being deviated in one or the other with respect to the +Y direction, which are arranged on the top side or the bottom side of the display elements 13 in a scattered manner. The central axis line YL 55 of the left-eye pixel 51, the central axis line YR 56 of the right-eye pixel 52, and the central axis line YG 57 of the display element 13 are glide planes (g) for the reflection plates.

Further, in the second exemplary embodiment, there is also glide plane (g) in the direction that is in parallel to the +X direction. Furthermore, a twofold rotational symmetry axis 59 that is the same as the above-described twofold rotational symmetry axis is the center of point symmetry for each reflection plate, so that the layout of the reflection plates is equivalent when the display device is rotated by 180 degrees on an X-Y plane. Therefore, regarding the reflection plate layout of the second exemplary embodiment, there are the twofold rotational symmetry axis and two independent glide planes (g). It is expressed as exhibiting symmetry of at least "p2gg" according to the international symbols of the two-dimensional space group.

When the two display elements 13 neighboring to each other in the +Y direction are stacked one over another, the reflective display areas 512 and 522 are arranged without being overlapped with each other. The reflective display areas 512 and 522 are extended to the top and bottom ends of the pixel in the direction perpendicular to the image distributing direction 14, and the reflective display areas 512 and 522 of the pixels neighboring to each other in the +X direction are in contact with each other. Meanwhile, the transistor areas are covered by the reflective display areas 512 and 522 as shown in FIG. 11.

Here, connecting relations regarding the gate lines G, the data line D, and each pixel will be summarized.

Referring to FIG. 11, a pixel P31 and a pixel P32 are considered first. These two pixels are connected to the gate line G3. That is, the two pixels take the gate line G3 as the common gate line. The pixels that are arranged neighboring to each other in the Y-axis direction and use a gate line in common are referred to as a neighboring pixel pair, and those pixels in a pair is expressed as (P31, P32) for convenience' sake. Each pixel configuring the neighboring pixel pair (P31, P32) is connected to different data lines. That is, the pixel P31 is connected to the data line D1, and the pixel P32 is connected to the data line D2.

A neighboring pixel pair (P22, P23) and a neighboring pixel pair (P43, P42) are placed as neighboring pairs of the neighboring pixel pair (P31, P32) in the +X direction. The neighboring pixel pair (P22, P23) takes the gate line G2 as the common gate line. Note here that the expression "the neighboring pixel pair takes the gate line G2 as the common gate line" means that each pixel configuring the neighboring pixel pair is connected to and controlled by the gate line G2, i.e., the gate line disposed between those pixels. The neighboring pixel pair (P31, P32) takes the gate line G3 as the common gate line, so that the neighboring pixel pair (P31, P32) and the neighboring pixel pair (P22, P23) take different gate line as the common gate line. The common gate lines for those pixel pairs are neighboring to each other. The neighboring pixel pair (P42, P43) is also disposed to be neighboring to the neighboring pixel pair (P31, P32) in the +X direction. These neighboring pixel pairs also take different gate line as the common gate line.

Further, a neighboring pixel pair (P33, P34) is arranged in the +X direction for the neighboring pixel pair (P22, P23) or the neighboring pixel pair (P42, P43). It is the same as the case of the neighboring pixel pair (P31, P32) that the neighboring pixel pair (P33, P34) takes the gate line G3 as the common gate line. That is, by every other pixel column, the neighboring pixel pair that takes the same gate line as the common gate line is disposed. In other words, the gate line connected to the neighboring pixel pair that configures the right-eye pixel is not connected to the neighboring pixel pair that configures the left-eye pixel.

With the above-described configuration, the display device of this exemplary embodiment includes: data lines for supplying display data to each of the pixels; pixel switching devices for transmitting display data signals from the data lines to the pixels; and gate lines for controlling the pixel switching devices, wherein: the neighboring pixel pair arranged by sandwiching the gate line is controlled by the gate line disposed between the pixels; the pixels configuring the neighboring pixel pair are connected to different data lines; and the neighboring pixel pairs neighboring to each other along the extending direction of the gate lines are connected to different gate lines. With such layout, the pixel thin film transistors can be efficiently arranged on the back-face side of the reflection plates with this exemplary embodiment.

In the explanations above, there has been described that the reflection plate is provided to cover the pixel thin film transistor. However, the reflection plate may be provided to cover only a part of the pixel thin film transistor. Further, the reflection plate may be provided in the storage capacitance. That is, by using the part that is not used for transmissive display for reflective display, the pixels can be used efficiently for the display. This makes it possible to improve the display performance.

Further, as shown in FIG. 11, when each of the pixels configuring the neighboring pixel pairs is disposed vertically by sandwiching the common gate lines, there may be disposed the neighboring pixel pair whose upper side pixel is connected to the left-side data line and the neighboring pixel pair whose upper-side pixel is connected to the right-side data line. With this, the polarity distributions of each pixel can be made uniform when the pixels are driven by inverting the polarities, so that the display quality can be improved. Furthermore, the part of one of the pixels configuring the neighboring pixel pair connected to the data line may be closer to the other pixel side than the gate line. This makes it possible to arrange the transmissive display areas and the reflective display areas of the pixels more efficiently, so that the display performance can be improved.

Further, with the transflective display device, light transmitting through the transmissive display areas 511 and 521 passes a color filter once, while the light passes the color filter twice in the reflective display areas. Thus, the color is corrected by providing a white area with a through hole or the like on a color layer. In the reflective display areas 512 and 522 of this exemplary embodiment, through holes are provided in the color filter (CF) over the neighboring pixels 51 and 52. Other structures are the same as those of the first exemplary embodiment described above.

(Operations/Effects)

As described in the first exemplary embodiment, it is also possible with the second exemplary embodiment to compensate the reflection component at the time of reflective display with the pixels 51 that are neighboring to each other in the +Y direction. Since the reflective display areas 512 and 522 are arranged in a scattered manner in a checkered pattern within the display plane, the reflected light making incident from the outside can be easily scattered. This provides an effect of making the reflected light more uniform.

Further, there is the glide plane (g) in the direction in parallel to the +X direction, so that the reflection component of the neighboring pixels 51 of the +X direction can be compensated. Thereby, the quality of the reflective display can be improved. Further, the reflection plates of this exemplary embodiment exhibit the twofold rotational symmetry, so that the same display quality as that of the original state can be maintained even when images are viewed from a position where the stereoscopic image display device is rotated by 180 degrees within the display plane. Therefore, the present invention can be preferably applied to a mobile device whose screen can be rotated by 180 degrees and a video camera whose monitor can be rotated.

Further, as described in the first exemplary embodiment, it is possible with the second exemplary embodiment to compensate the reflective areas not only with the neighboring pixels of the +X direction but also with the neighboring pixels of the +Y direction. While the explanations above have been described by referring to the case of using the lenticular lens, it is needless to say that the present invention can be applied to the case of using the fly-eye lens. FIG. 12 is a perspective view showing a fly-eye lens 10.

Figure 28:
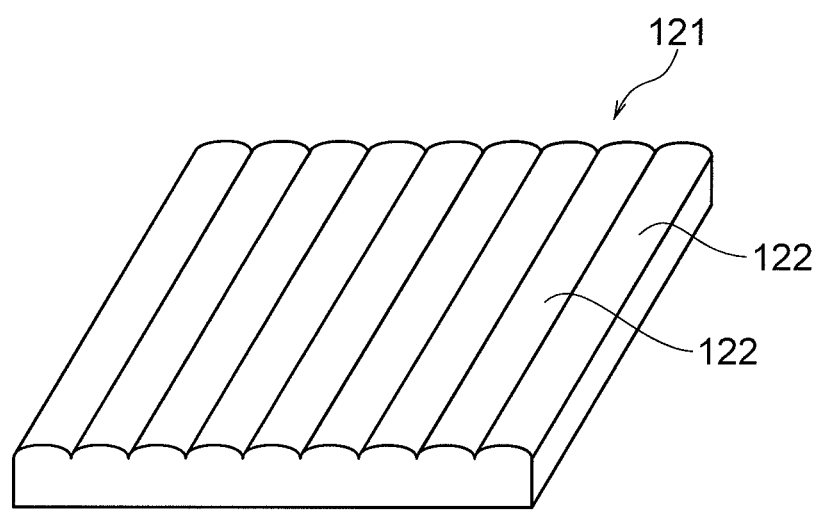
FIG. 28 is an explanatory diagram showing a shape of a lenticular lens 3.
Figure 29:
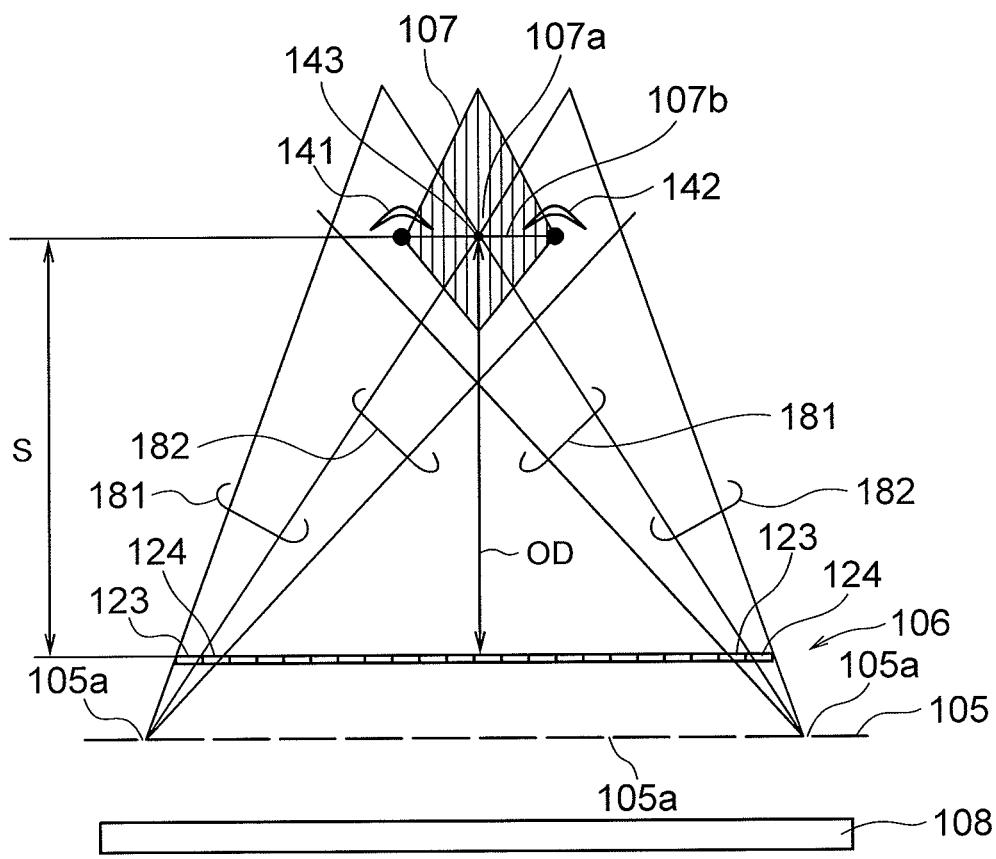
FIG. 29 is an explanatory diagram showing an optical model which shows a stereoscopic image display method using a parallax barrier according to a related technique.
Figure 30:
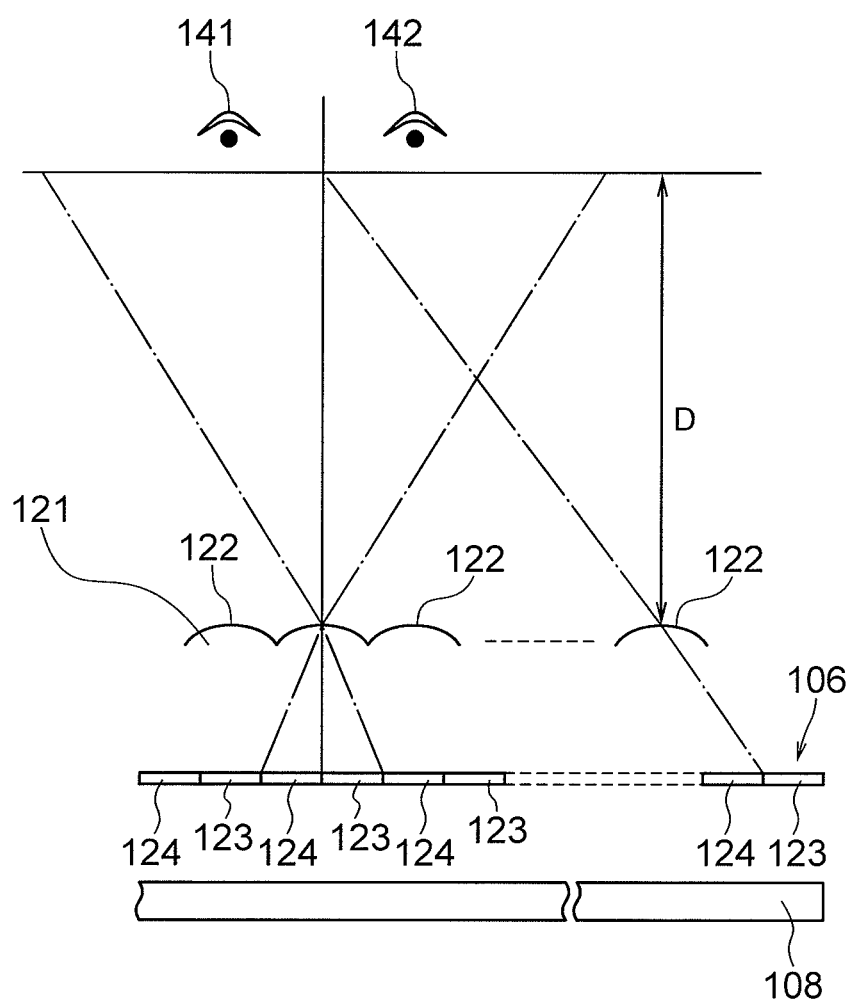
FIG. 30 is an explanatory diagram showing an optical model which shows a stereoscopic image display method using a lenticular lens according to a related technique.

As shown in FIG. 28, the lenticular lens 3 has the shape in which the cylindrical lenses 3a extended in one direction are arranged in parallel to each other. The convex face is repeatedly provided in the direction connecting the left-eye pixel 51 and the right-eye pixel 52 of one display unit, i.e., in the lateral direction, and there is no change on the surface of the lenticular lens in the longitudinal direction that is orthogonal to the lateral direction. That is, there is no change in the shape of the section extended in the lateral direction towards the longitudinal direction of the lenticular lens 3.

In the meantime, the fly-eye lens 10 has the convex faces repeatedly provided in the direction connecting the left-eye pixel 51 and the right-eye pixel 52 as well as in the direction that is orthogonal to the connecting direction. That is, it is the same as the case of the lenticular lens 3 that a single convex face is arranged for a pair of left-eye pixel and right-eye pixel in the direction (lateral direction) along which the left-eye pixel 51 and the right-eye pixel 52 of one display unit oppose each other. However, in the fly-eye lens 10, one convex face is also arranged by every two pixels (two right-eye pixels or two left-eye pixels) in the direction orthogonal to the lateral direction.

In the case of using the fly-eye lens 10, it is also possible for the viewer to view the top and bottom side faces of the images through distributing the images in the vertical direction to widen the viewing angle in addition to providing the stereoscopic views by displaying images exclusively for the left and right eyes, when the stereoscopic image display device is set and the viewer observes the device. As described, it is also possible to achieve the same effects as those of the first exemplary embodiment described above even when the fly-eye lens 10 is used for the lens. Particularly, the reflection plates of the second exemplary embodiment are arranged in a scattered manner along the +Y direction, so that it is possible to provide high-quality reflective display to which the fly-eye lens 10 is preferably applied. Other structures and operational effects are the same as those of the first exemplary embodiment described above. Further, by providing the through holes in the reflective areas over the two neighboring pixels, a larger dimension of through holes can be secured than the dimension one pixel requires. Therefore, the through holes can be formed without minding restriction of the micromachining, so that it is possible to correspond to the high-definition pixels of small size.

Third Exemplary Embodiment

Next, a third exemplary embodiment of the invention will be described by referring to FIG. 13-FIG. 16.

Figure 13:
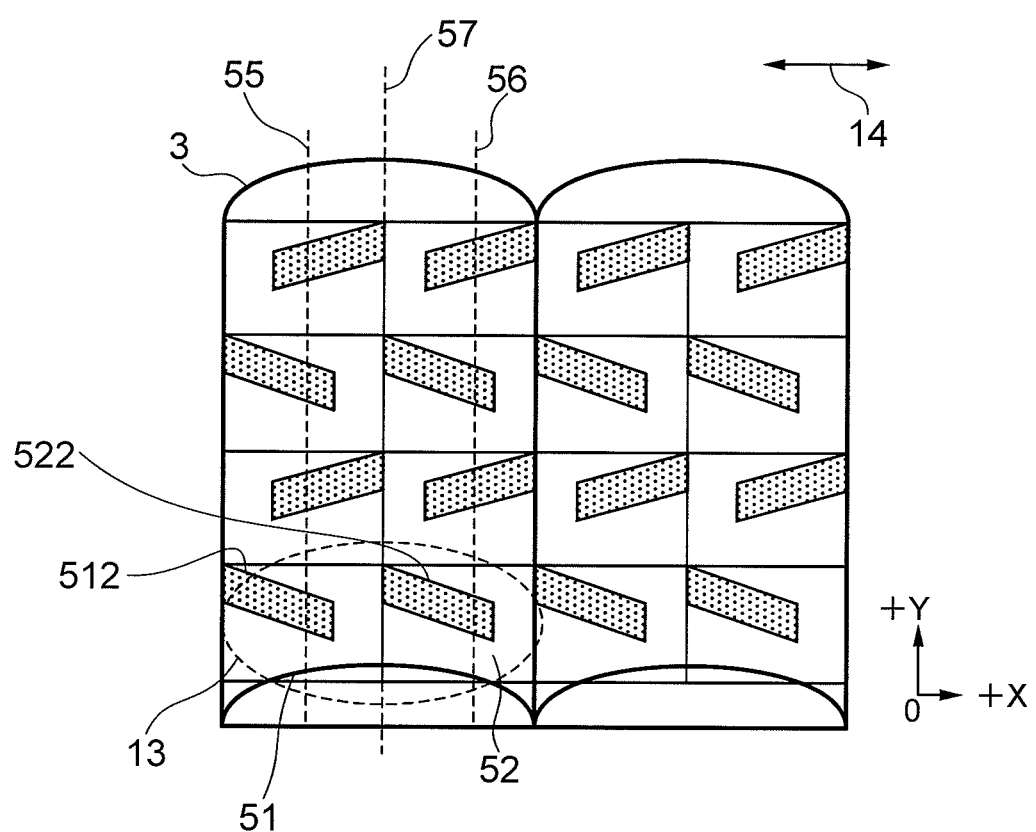
FIG. 13 is a top plan view showing a part of a stereoscopic image display device according to a third exemplary embodiment of the present invention, which is a model illustration showing layout of the structural contents of the display element parts.
Figure 14:
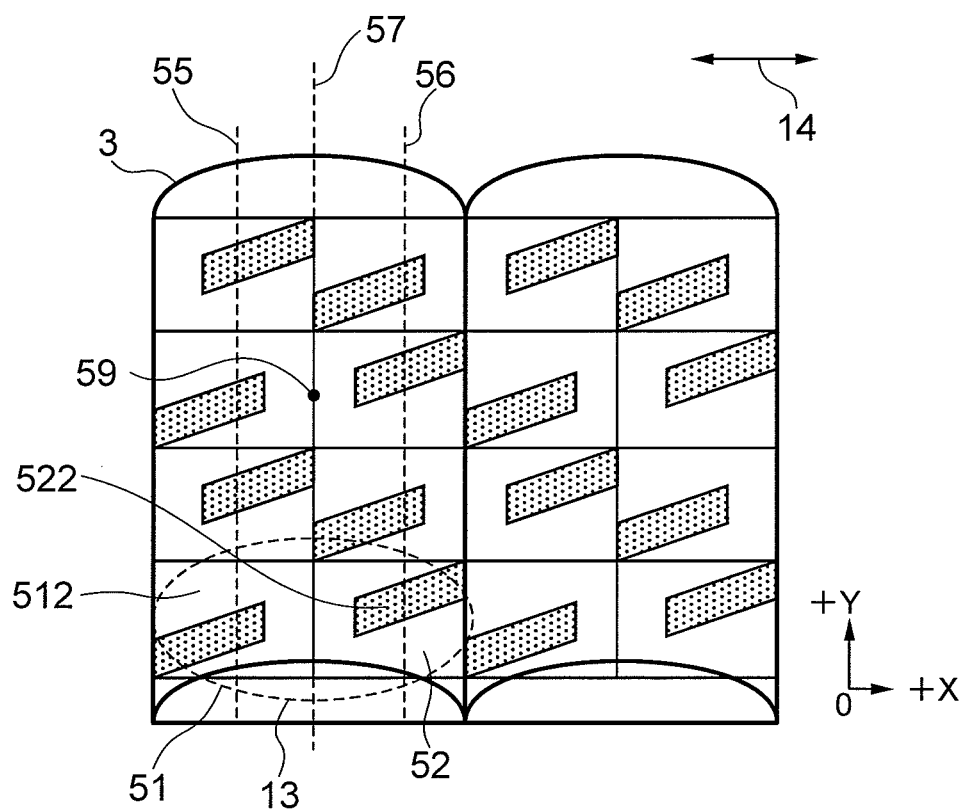
FIG. 14 is a model illustration showing layout of the structural contents of display element parts according to Modification Example 1 of the third exemplary embodiment.
Figure 15:
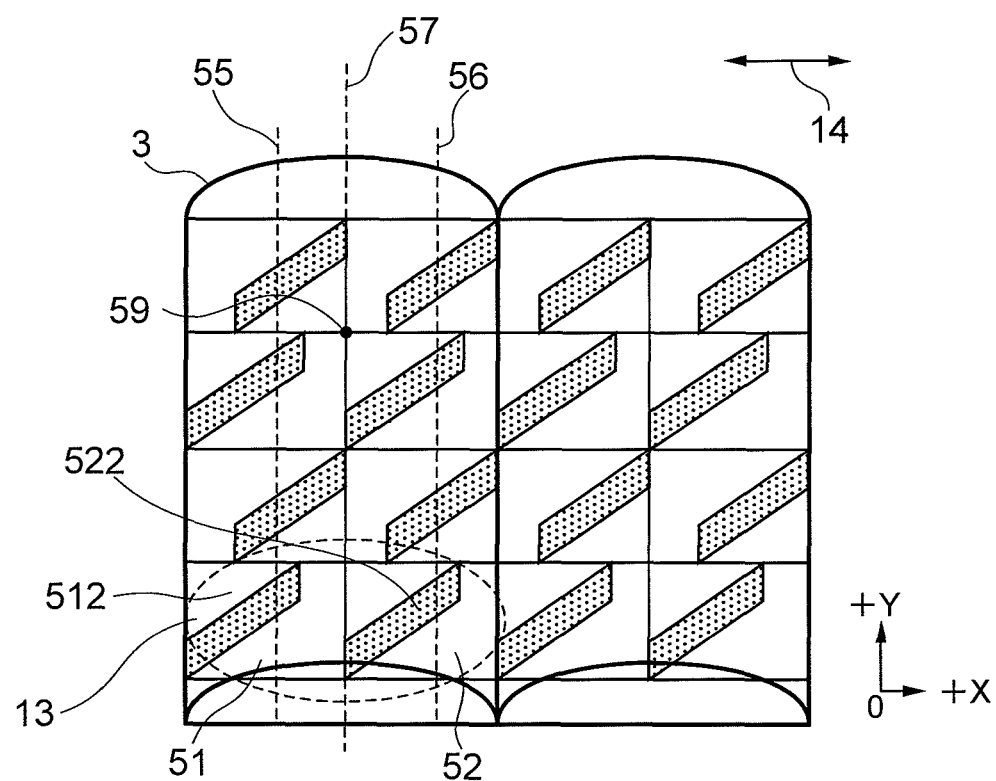
FIG. 15 is a model illustration showing layout of the structural contents of display element parts according to Modification Example 2 of the third exemplary embodiment.
Figure 16:
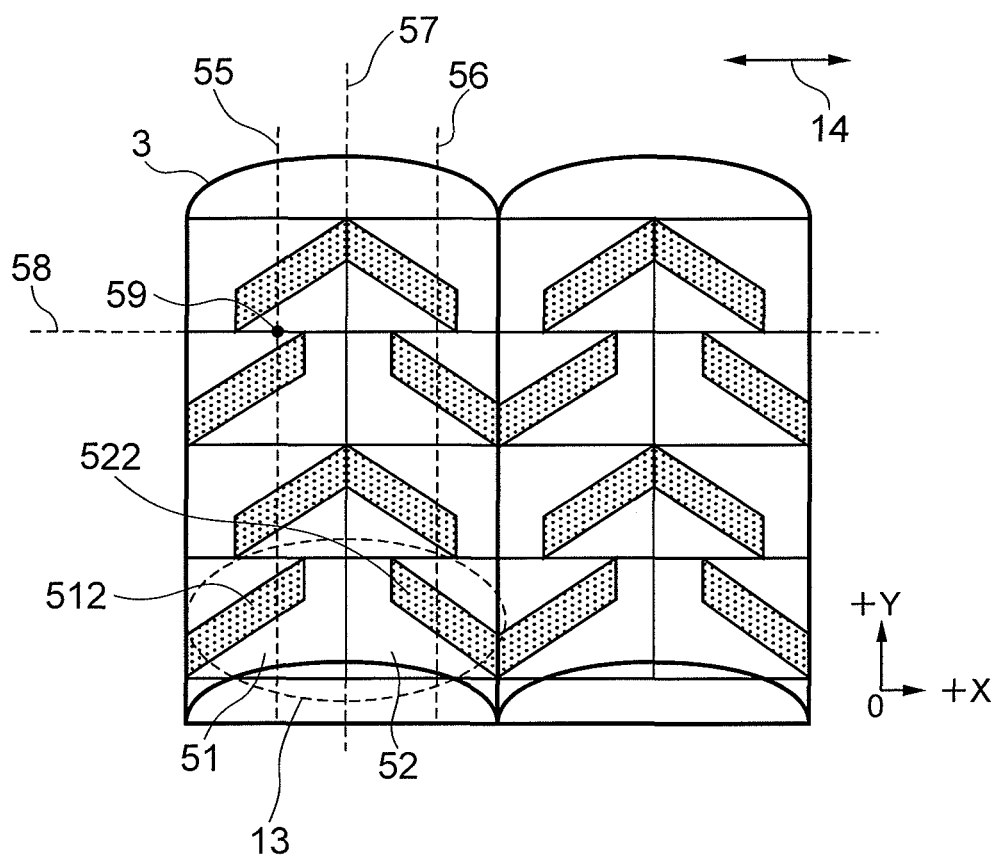
FIG. 16 is a model illustration showing layout of the structural contents of display element parts according to Modification Example 3 of the third exemplary embodiment.

FIG. 13 is a top plan view showing a part of a stereoscopic image display device according to the third exemplary embodiment. Further, FIG. 14 is a top plan view showing a stereoscopic image display device according to Modification Example 1 of the third exemplary embodiment, FIG. 15 is a top plan view showing a stereoscopic image display device according to Modification Example 2 of the third exemplary embodiment, and FIG. 16 is a top plan view showing a stereoscopic image display device according to Modification Example 3 of the third exemplary embodiment.

(Structure)

First, the third exemplary embodiment of the invention will be described, and Modification Examples 1-3 will be described thereafter.

First, as shown in FIG. 13, the reflective display areas 512 and 522 disposed within the display elements 13 neighboring to each other on the left and right sides are formed with reflection plates 41 that are tilted with respect to the +Y direction, which are arranged on the top side or the bottom side of the display elements 13 in a scattered manner. The central axis line YL 55 of the left-eye pixel 51, the central axis line YR 56 of the right-eye pixel 52, and the central axis line YG 57 of the display element 13 are glide planes (g) for the reflection plate. Therefore, there is symmetry of at least "pg" according to the international symbols of the two-dimensional space group. Other structures are the same as those of the first exemplary embodiment described above.

(Operations/Effects)

As described in the first exemplary embodiment, it is also possible with the third exemplary embodiment to compensate the reflection component at the time of reflective display with the pixels 51 or the pixels 52 that are neighboring to each other in the +Y direction. Since the reflective display areas 512 and 522 are arranged in a scattered manner in a checkered pattern within the display plane, the reflected light making incident from the outside can be easily scattered. This provides an effect of making the reflected light more uniform. Particularly, since the reflection plates are tilted, interference fringes that may be caused due to the pixel layout period and the lens structure period can be decreased. Thus, it is possible to provide a high-quality display. Other structures and operational effects are the same as those of the first exemplary embodiment described above.

Modification Example 1

Next, Modification Example 1 of the third exemplary embodiment will be described by referring to FIG. 14.

In Modification Example 1, as shown in FIG. 14, the reflective display areas disposed within the display elements 13 neighboring to each other on the left and right sides are formed with reflection plates 41 that are tilted with respect to the +Y direction, which are arranged on the top side or the bottom side of the display elements 13 in a scattered manner. Further, a twofold rotational symmetry axis 59 is the center of point symmetry for each reflection plate 41, so that the layout of the reflection plate 41 is equivalent when it is rotated by 180 degrees. Therefore, there is the twofold rotational symmetry axis in the layout of the reflection plate 41 of Modification Example 1, and it can be expressed as having symmetry of at least "p2" according to the international symbols of the two-dimensional space group. Other structures are the same as those of the third exemplary embodiment described above.

As described in the first exemplary embodiment (see FIG. 4), it is also possible with Modification Example 1 of the third exemplary embodiment to compensate the reflection component at the time of reflective display with the pixels that are neighboring to each other in the +Y direction. Since the reflective display areas are arranged in a scattered manner in a checkered pattern within the display plane, the reflected light making incident from the outside can be easily scattered. This provides an effect of making the reflected light more uniform. Further, there are the glide planes (g) in the direction in parallel to the +X direction, so that the reflection component of the neighboring pixels of the +X direction can be compensated, when the fly-eye lens is used. Thereby, the quality of the reflective display can be improved.

Further, the reflection plates of Modification Example 1 of the third exemplary embodiment are arranged in the layout having the twofold rotational symmetry, so that the same display quality as that of the original state can be maintained even when images are viewed from a position where the stereoscopic image display device is rotated by 180 degrees within the display plane. Therefore, the present invention can be preferably applied to a mobile device whose screen can be rotated by 180 degrees and a video camera whose monitor can be rotated.

Modification Example 2

Next, Modification Example 2 of the third exemplary embodiment will be described by referring to FIG. 15.

As shown in FIG. 15, the reflective display areas disposed within the display elements 13 neighboring to each other on the left and right sides are arranged on the top side or the bottom side of the display elements 13 in a scattered manner. When the two display elements 13 neighboring to each other in the +X direction (+Y direction) are stacked on one another, the reflective display areas can be continuously formed without a break.

The twofold rotational symmetry axis 59 is the center of point symmetry for each reflection plate 41, so that the layout of the reflection plate 41 is equivalent when rotated by 180 degrees. The display device according to Modification Example 2 has the twofold rotational symmetry axis, and it can be expressed as having symmetry of at least "p2" according to the international symbols of the two-dimensional space group. Other structures are the same as those of the third exemplary embodiment described above.

Therefore, especially in a case of using the fly-eye lens, it is possible with Modification Example 2 of the third exemplary embodiment to perform continuous neighbor compensation without a break in the reflective areas both in the +Y direction and the +X direction as described above. This makes it possible to provide high-quality reflective displays with smaller reflective display unevenness. Other structures and operational effects are the same as those of the third exemplary embodiment described above.

Modification Example 3

Next, Modification Example 3 of the third exemplary embodiment will be described by referring to FIG. 16.

As shown in FIG. 16, the reflective display areas 512 and 522 disposed within the display elements 13 neighboring to each other on the left and right sides are arranged on the top side or the bottom side of the display elements 13 in a scattered manner. When the two display elements 13 neighboring to each other in the +X direction (+Y direction) are stacked on one another, the reflective display areas can be continuously formed without a break.

Further, the twofold rotational symmetry axis 59 is the center of point symmetry for each reflection plate 41, so that the layout of the reflection plate 41 is equivalent when rotated by 180 degrees. The central axis line YG 57 of the display element 13 is a mirror plane (m) of the reflection plate, and there is a glide plane (g) 58 in the +X direction. Therefore, the display device according to Modification Example 3 has the twofold rotational symmetry axis, the glide plane (g), and the mirror plane (m). It can be expressed as having symmetry of at least "p2mg" according to the international symbols of the two-dimensional space group. Other structures are the same as those of the third exemplary embodiment described above.

Therefore, especially in a case of using the fly-eye lens, it is possible with Modification Example 3 of the third exemplary embodiment to perform continuous neighbor compensation without a break in the reflective areas both in the +Y direction and the +X direction as described above. Thus, high-quality reflective display with smaller reflective display unevenness can be provided. Further, when same information is displayed at the left and right pixels 51 and 52 to show two-dimensional images, it is possible to provide a high-quality display device with an excellent symmetry in the left-and-right direction since the reflection plates are line-symmetrical (reflection symmetrical) with respect to the central axis line YG 57 of the display element.

Further, the layout of the reflective display areas has the twofold rotational symmetry, so that it is possible to provide uniform reflective displays as same as that of the original state even when the display device is rotated by 180 degrees within the display plane. Therefore, the present invention can be preferably applied to a portable device whose screen can be rotated by 180 degrees or a video camera whose monitor screen can be rotated. Other structures and operational effects are the same as those of the third exemplary embodiment described above.

Fourth Exemplary Embodiment

Next, a fourth exemplary embodiment of the invention will be described by referring to FIG. 17-FIG. 19.

Figure 17:
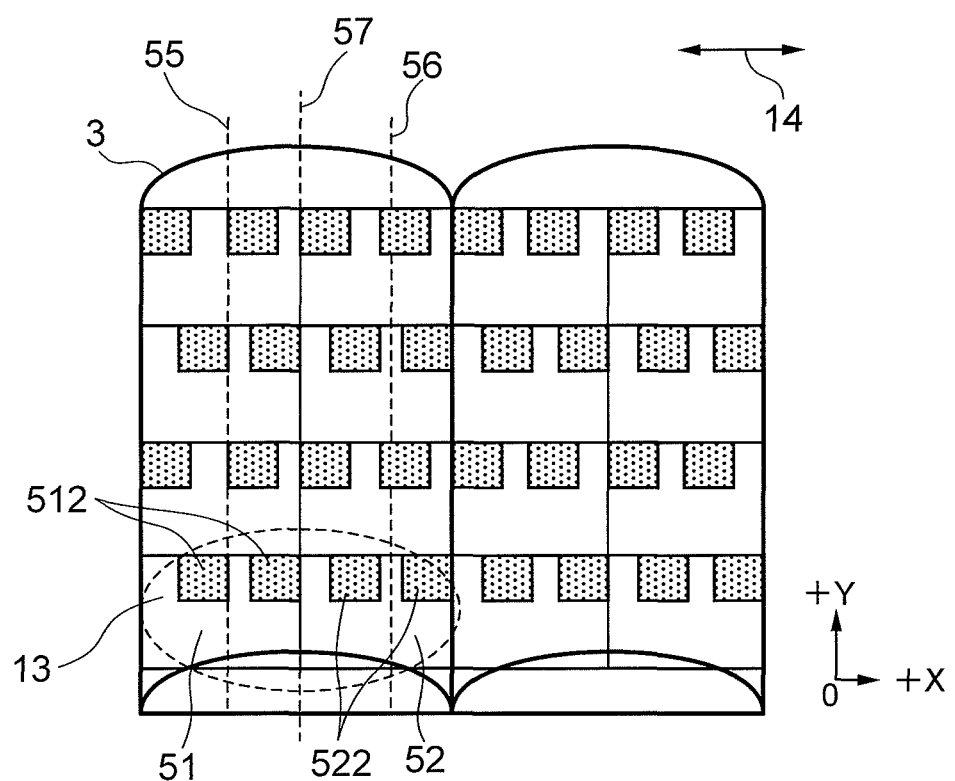
FIG. 17 is a top plan view showing a part of a stereoscopic image display device according to a fourth exemplary embodiment of the present invention, which is a model illustration showing layout of the structural contents of the display element parts.

FIG. 17 is a top plan view showing a stereoscopic image display device according to the fourth exemplary embodiment. Further, FIG. 18 is a top plan view showing a stereoscopic image display device according to Modification Example 1 of the fourth exemplary embodiment, and FIG. 19 is a top plan view showing a stereoscopic image display device according to Modification Example 2 of the fourth exemplary embodiment.

(Structure)

As shown in FIG. 17, in the fourth exemplary embodiment, the reflective area 512 within the left-eye pixel 51 is disposed in two places in a scattered manner, which are arranged asymmetrically with respect to the left-eye pixel central axis line YL 55. In the same manner, the reflective area 522 within the right-eye pixel 52 is disposed in two places in a scattered manner, which are arranged asymmetrically with respect to the right-eye pixel central axis line YR 56. Further, the reflective areas are arranged asymmetrically with respect to the central axis line –YG 57 of the display element 13. There are two kinds in the layout patterns of the reflection plates within the display elements 13, and those patterns are arranged neighboring to each other in the +Y direction.

The two kinds of neighboring display element patterns are inverted line-symmetrically with respect to the respective central axis line 57. The two kinds of display elements 13 are arranged periodically in the +Y direction. The central axis line YL 55 of the left-eye pixel 51, the central axis line YR 56 of the right-eye pixel 52, and the central axis line YG 57 of the display element 13 are glide planes (g) for the reflection plate. It is expressed as having symmetry of at least "pg" according to the international symbols of the two-dimensional space group. Other structures are the same as those of the third exemplary embodiment described above.

(Operations/Effects)

Therefore, with the fourth exemplary embodiment, there are a plurality of reflective display areas within a single pixel 51 and a single pixel 52. Thereby, light making incident from the outside can be reflected diffusively. This makes it possible to provide high-quality reflective displays that exhibit no partial deterioration in the luminance regardless of the viewing positions. Especially, the period of arranging the reflective display areas can be set smaller with the fourth exemplary embodiment, so that interference fringes generated due to the reflective display areas can be decreased. Further, since there are a plurality of reflection plates, the reflective display unevenness caused due to shift generated at the time of mounting the lenticular lens can be decreased. This results in decreasing the deterioration of the yield.

Further, with the fourth exemplary embodiment, the plurality of reflective areas can be arranged in a scattered manner in the +Y direction as shown in FIG. 17. Thereby, the present invention can be preferably applied to the fly-eye lens or the display elements capable of distributing images laterally and vertically. Furthermore, the reflective display area within one pixel may be arranged in three or more places in a scattered manner, which makes it possible to provide more uniform reflective displays that exhibit no partial deterioration in the luminance.

Modification Example 1

Next, Modification Example 1 of the fourth exemplary embodiment will be described by referring to FIG. 18.

Figure 18:
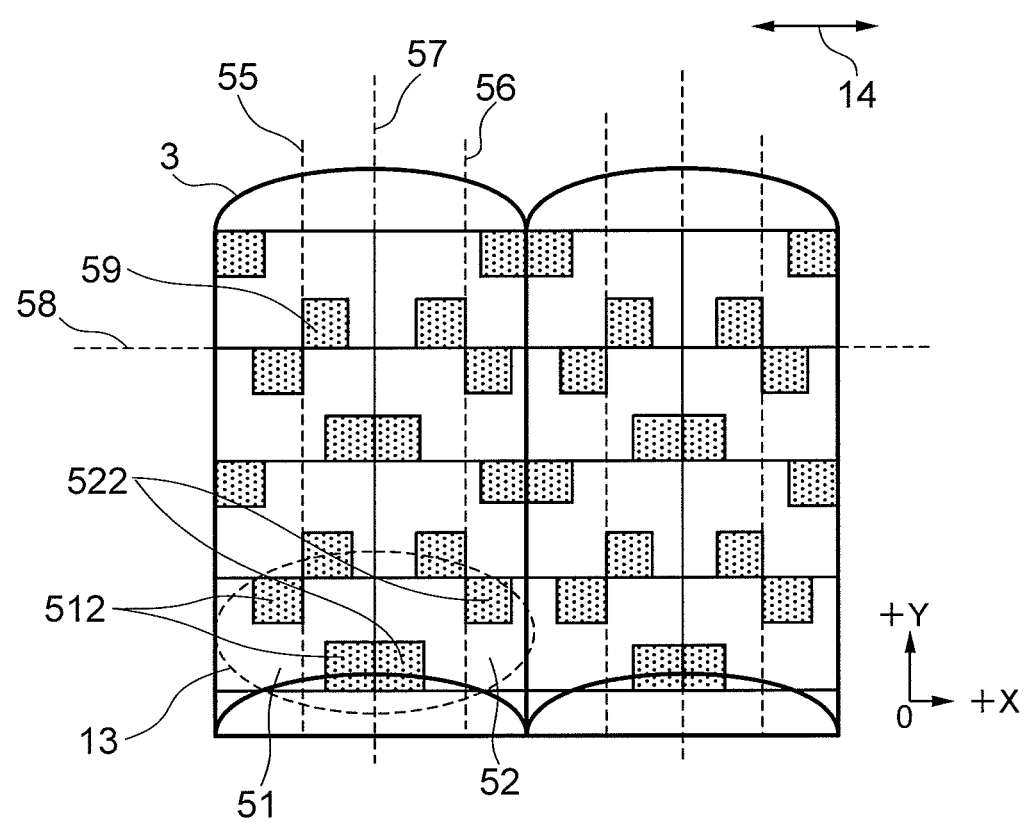
FIG. 18 is a model illustration showing layout of the structural contents of display element parts according to Modification Example 1 of the fourth exemplary embodiment.

In Modification Example 1 shown in FIG. 18, the reflective area 512 within the left-eye pixel 51 is disposed in two places in a scattered manner, which are arranged asymmetrically with respect to the central axis line YL 55 of the left-eye pixel 51. In the same manner, the reflective area 522 within the right-eye pixel 52 is disposed in two places in a scattered manner, which are arranged asymmetrically with respect to the central axis line YR 56 of the right-eye pixel 52. Further, the central axis line YG 57 of the display element 13 is a reflection axis (line-symmetry axis) for the reflection plate 41, which is the mirror plane (m) at the reflection plate position.

Further, the reflection plates are arranged inversion-symmetrically with respect to point G, so that there is twofold symmetry. Therefore, the layout of the reflection plates according to Modification Example 1 has the twofold axis and the individual mirror plane (m), and it can be expressed as having symmetry of at least "p2mg" according to the international symbols of the two-dimensional space group. Other structures are the same as those of the fourth exemplary embodiment described above.

Since there is the mirror plane (m) in parallel to the +X direction with Modification Example 1 of the fourth exemplary embodiment, it is possible to perform compensation with the pixels neighboring to each other in the +X direction when the fly-eye lens is employed. This makes it possible to provide high-quality reflective displays that exhibit no partial deterioration in the luminance regardless of the viewing positions.

Modification Example 2

Next, Modification Example 2 of the fourth exemplary embodiment will be described by referring to FIG. 19.

Figure 19:
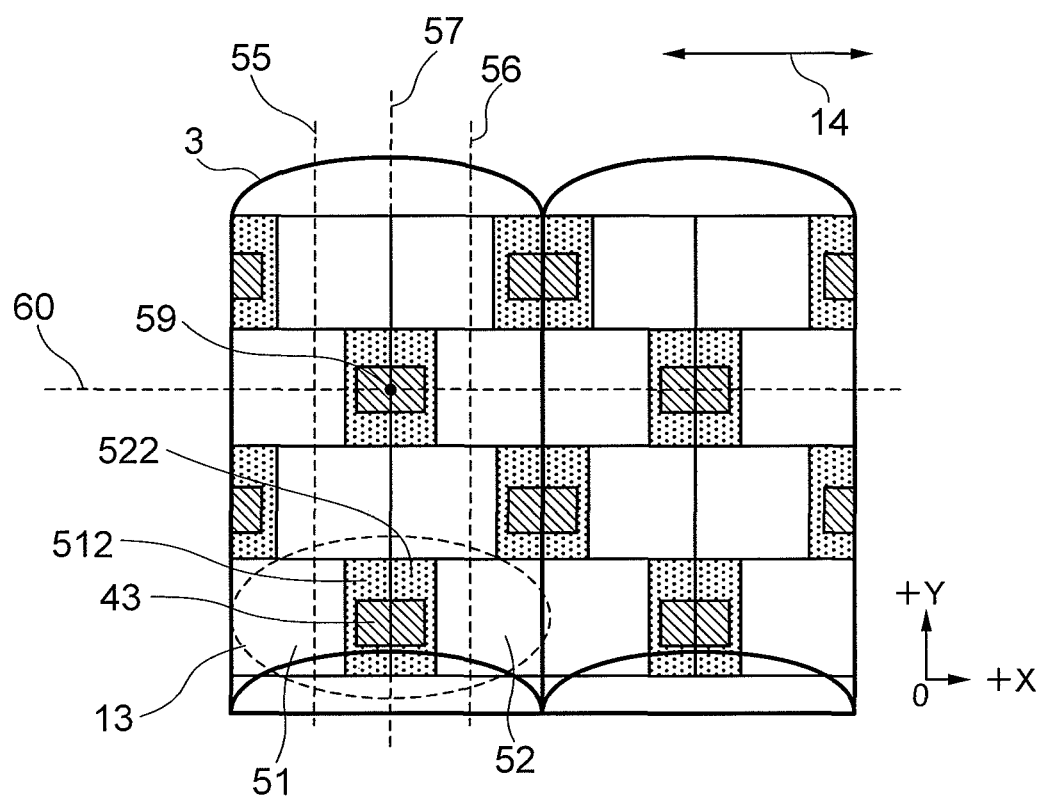
FIG. 19 is a model illustration showing layout of the structural contents of display element parts according to Modification Example 2 of the fourth exemplary embodiment.

In Modification Example 2 of the fourth exemplary embodiment, as shown in FIG. 19, the first display element 13 is configured with the left and right pixels 51 and 52, and the reflective display area in each pixel is arranged in two places in a scattered manner. Further, the second display element 13 neighboring to the first display element 13 in the +Y direction is configured with the left and right pixels 51 and 52, and the reflection plate in each pixel is configured with a single area.

The central axis line YL 55 of the left-eye pixel 51, the central axis line YR 56 of the right-eye pixel 52, and the central axis line YG 57 of the display element 13 are line-symmetrical axes (reflection-symmetrical axes) of the reflection plate in each pixel, which work as the mirror planes (m).

Further, the layout of the reflection plates has the twofold rotational symmetry, so that the layout is equivalent as that of the original state when rotated by 180 degrees with respect to the twofold rotational symmetry axis 59. Therefore, there exists the symmetry of at least "c2mm" according to the international symbols of the two-dimensional space group. Other structures are the same as those of the fourth exemplary embodiment described above.

Therefore, with Modification Example 2 of the fourth exemplary embodiment, the reflection plate 41 provided in each of the pixels 51, 52 is arranged line-symmetrically with respect to the central axis line of each of the pixels 51, 52. This makes it possible to provide high-quality images with reflective display, which are uniform on the left and right sides.

Fifth Exemplary Embodiment

Next, a fifth exemplary embodiment of the invention will be described by referring to FIG. 20-FIG. 25.

Figure 20:
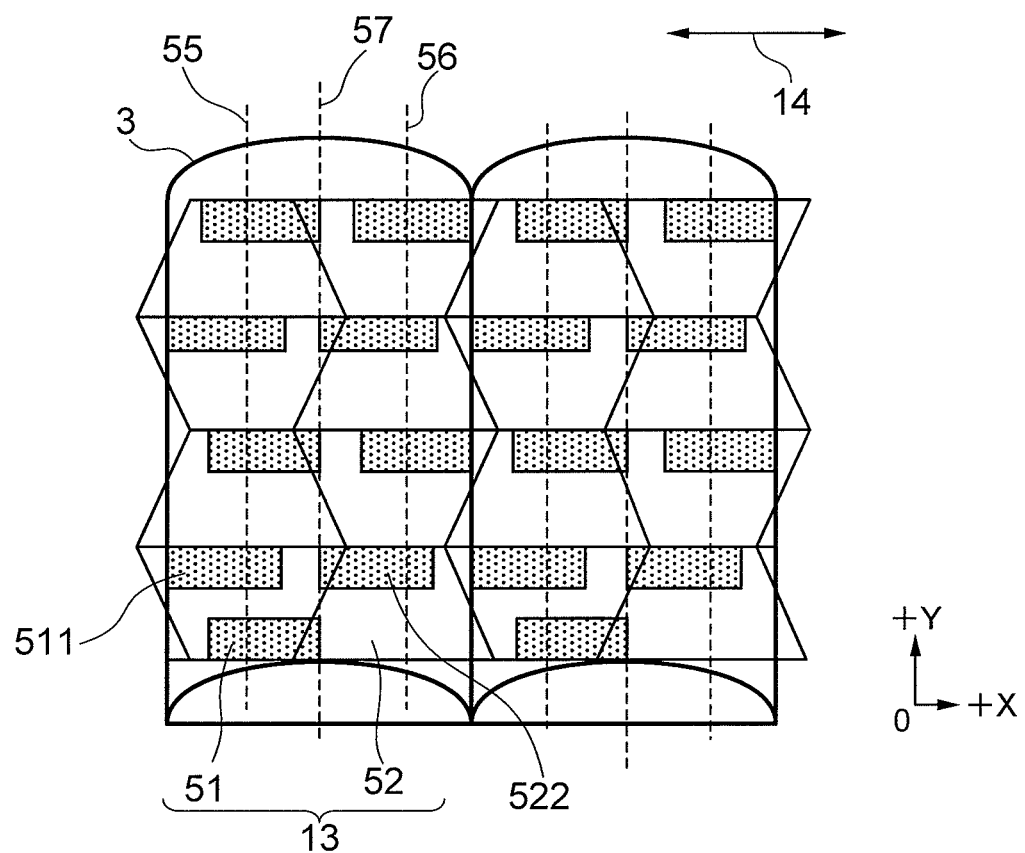
FIG. 20 is a top plan view showing a part of a stereoscopic image display device according to a fifth exemplary embodiment of the present invention, which is a model illustration showing layout of the structural contents of the display element parts.
Figure 21:
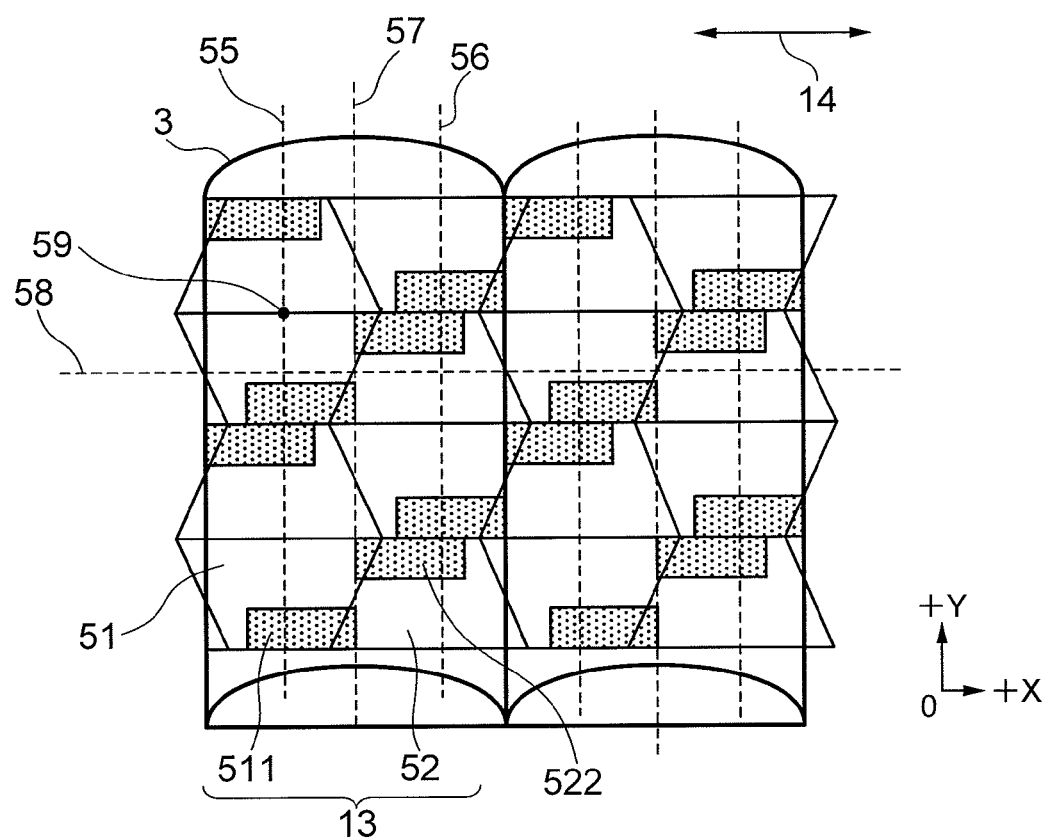
FIG. 21 is a model illustration showing layout of the structural contents of display element parts according to Modification Example 1 of the fifth exemplary embodiment.
Figure 22:
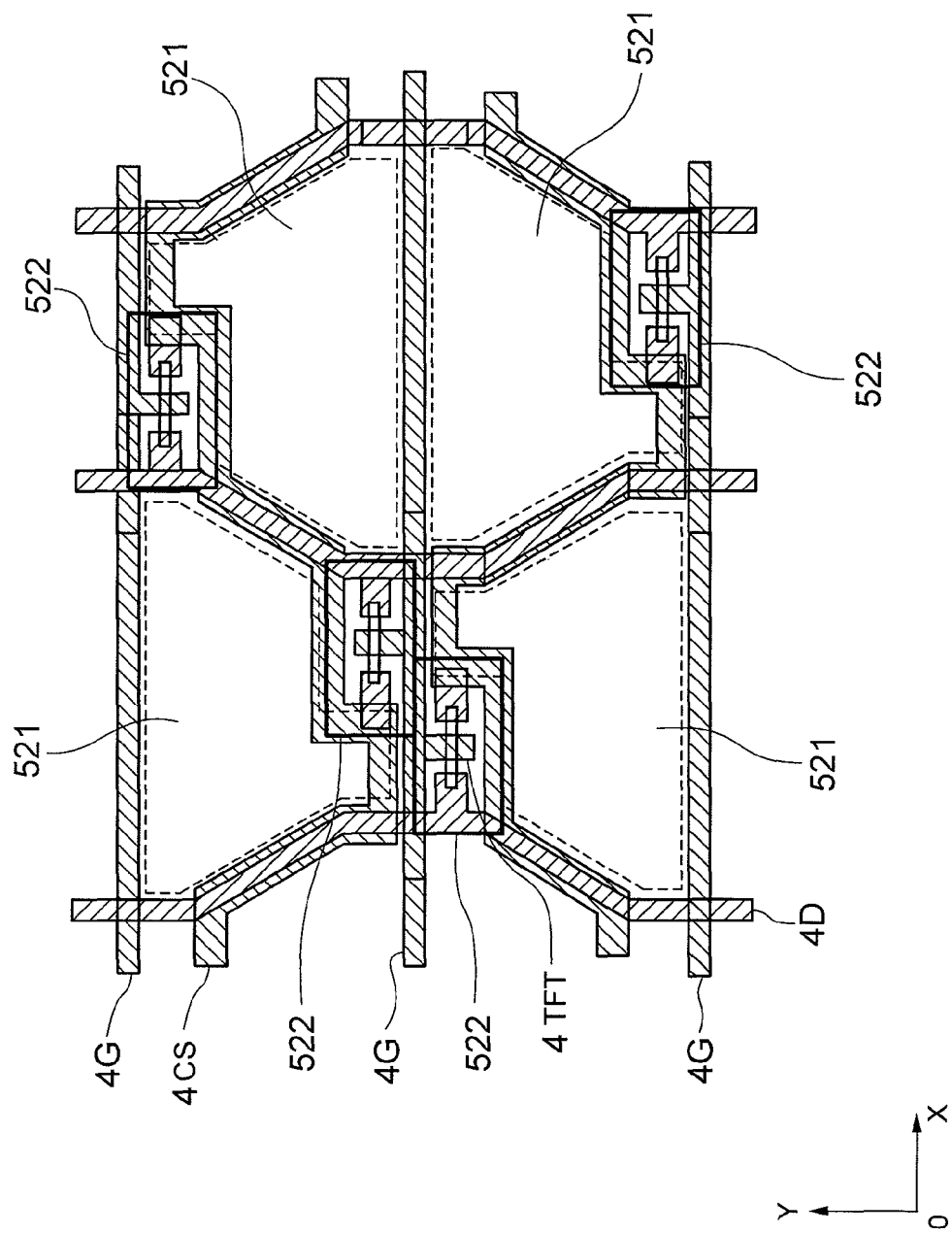
FIG. 22 is an enlarged explanatory view showing a specific example of layout of pixel transistors that are disposed by corresponding to the pixel parts of FIG. 21.
Figure 23:
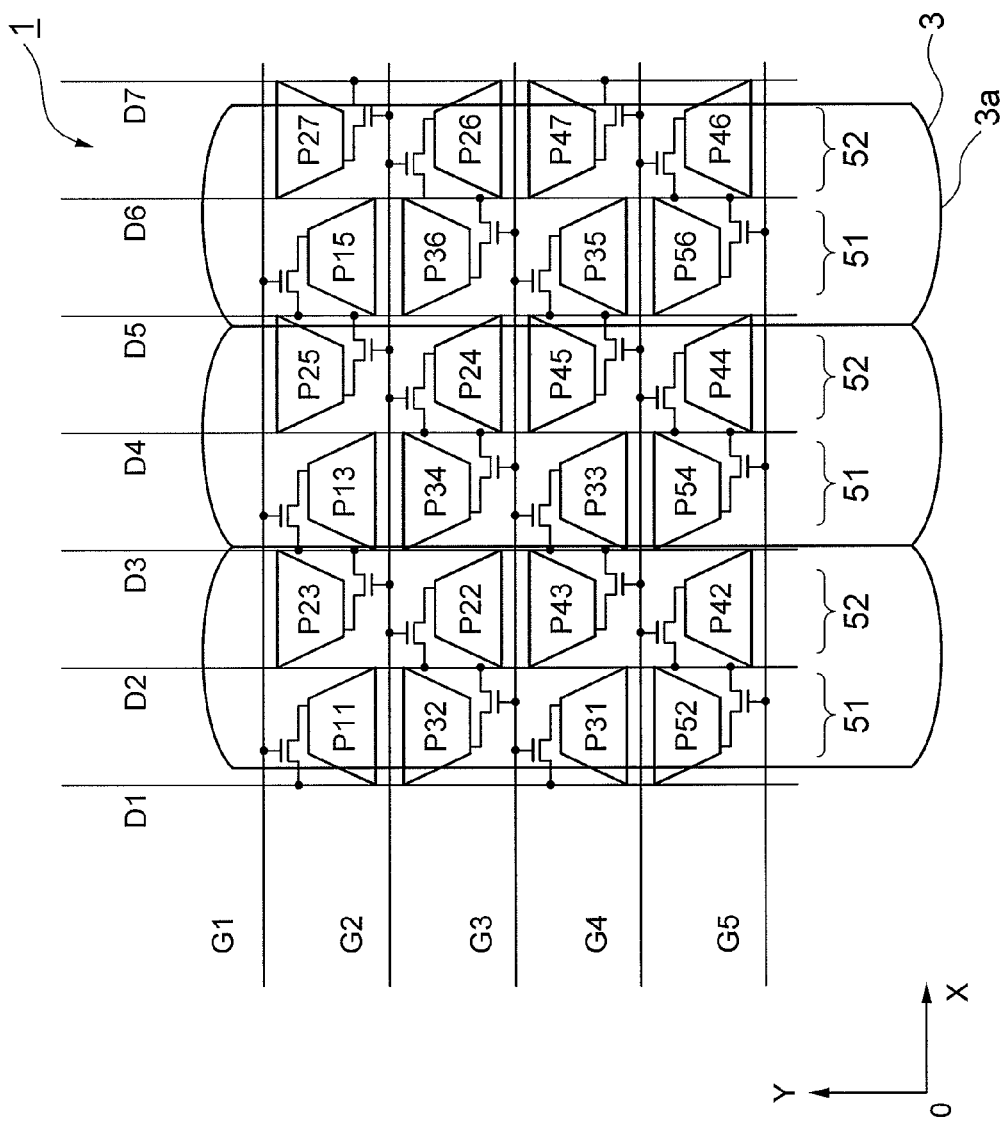
FIG. 23 is a model illustration showing layout of pixel transistors that are disposed by corresponding to the pixel parts of FIG. 21.
Figure 24:
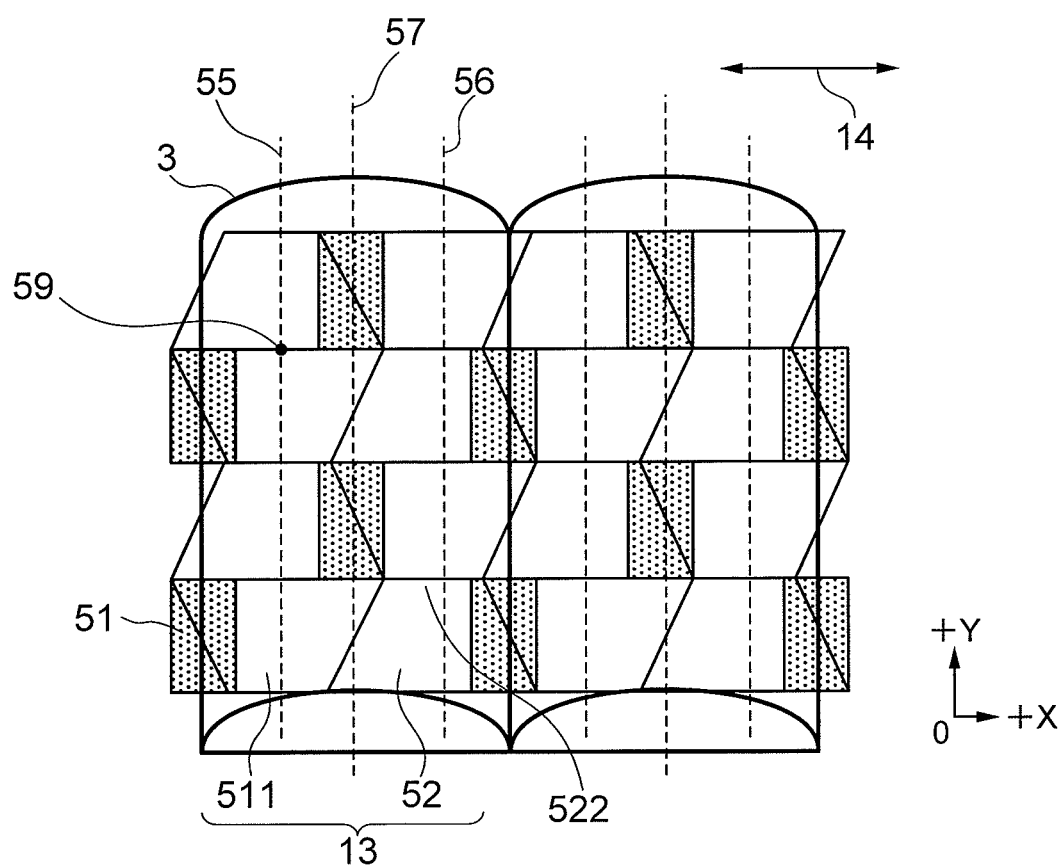
FIG. 24 is a model illustration showing layout of the structural contents of display element parts according to Modification Example 2 of the fifth exemplary embodiment.
Figure 25:
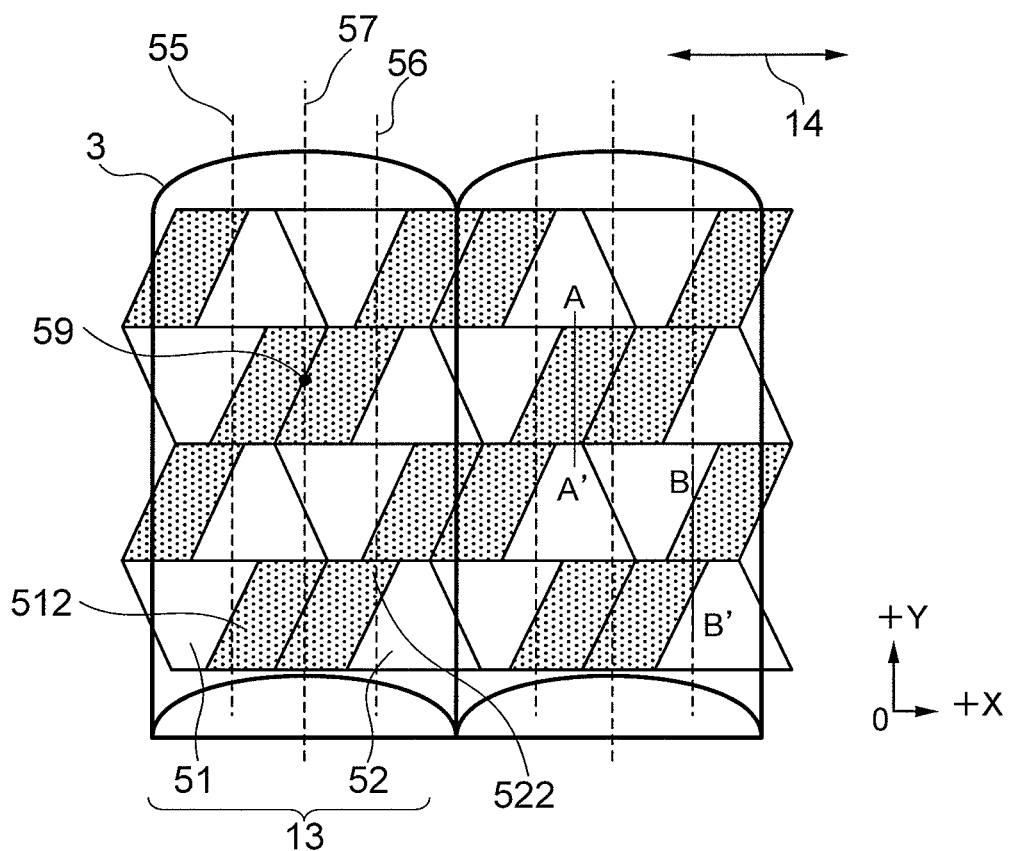
FIG. 25 is a model illustration showing layout of the structural contents of display element parts according to Modification Example 3 of the fifth exemplary embodiment.

FIG. 20 is a top plan view showing a stereoscopic image display device according to the fifth exemplary embodiment. FIG. 21 is a top plan view showing the pixels of a stereoscopic image display device according to Modification Example 1 of the fifth exemplary embodiment. FIG. 22 is an enlarged explanatory view showing layout of pixel transistors in a part of the pixel parts of FIG. 21. FIG. 23 is a model illustration showing the layout of the pixel transistors that are disposed by corresponding to the pixel parts of FIG. 21. FIG. 24 is a top plan view showing a stereoscopic image display device according to Modification Example 2 of the fifth exemplary embodiment. FIG. 25 is a top plan view showing a stereoscopic image display device according to Modification Example 3 of the fifth exemplary embodiment.

(Structure)

In the stereoscopic image display device according to the fifth exemplary embodiment, as shown in FIG. 20, the external shape of the left-eye pixels 51 and the right-eye pixel 52 is a trapezoid, and the boundary between each of the pixels neighboring to the +X direction is tilted with respect to the direction that is orthogonal to the image distributing direction 14. Further, specifically for the external shape of the pixels that have no reflective areas 511, 521, the pixels neighboring to each other in the +Y direction are arranged line-symmetrically with respect to the X-axis direction, and the pixels neighboring to each other in the +X direction are arranged line-symmetrically with respect to the X-axis direction. Therefore, two pixels neighboring to the +Y direction makes a hexagon, and it is provided all over in matrix.

Further, as in the case of FIG. 1, the left and right reflection plates of the display element 13 are arranged asymmetrically with respect to the left-eye pixel central axis line YL 55, the right-eye pixel central axis line YR 56, and the central axis line YG 57 of the display element 13. The display elements 13 neighboring to each other in the +Y direction have different reflective display area layout from each other, and the display elements 13 are disposed periodically in the +Y direction. Regarding the symmetry in terms of the reflection plate layout alone, each of the left-eye pixel central axis line YL 55, the right-eye pixel central axis line YR 56, and the central axis line YG 57 of the display element 13 works as the glide plane (g) for the reflection plate. Other structures are the same as those of the fourth exemplary embodiment described above.

(Operations/Effects)

In the stereoscopic image display device according to the fifth exemplary embodiment, as shown in FIG. 20, there are the glide planes (g) that are in parallel to the +Y direction. Thus, reflected images can be compensated between the pixels that are neighboring to the +Y direction. This makes it possible to provide high-quality reflective displays that exhibit no partial deterioration in the luminance regardless of the viewing positions. Furthermore, data wirings can be drawn obliquely to be efficiently arranged without interfering with the reflective areas, so that the pixel numerical aperture can be set larger. Furthermore, the aperture parts of the left and right pixels are arranged alternately at the lens focal point positions, so that the transmission light in the left and right directions can be scattered. This makes it possible to provide more uniform display images.

Further, as shown in FIG. 22, the data wiring is arranged by being tilted with respect to the Y-axis direction, and the direction of the periods of arranging the convex parts of the lenticular lens 3 and the direction of the periods of arranging the data lines are scattered from each other. Thereby, moiré fringes caused due to the pitch of the convex part of the lenticular lens 3 and the arranging pitch of the data lines 4D can be decreased, which results in improving the display quality.

Moreover, the left-eye pixel 51 and the right-eye pixel 52 may be formed in a polygon, as long as each of the pixels has the same dimension. Further, each of those pixels may be formed in a polygon configured with a combination of simple figure such as a triangle, a rhomboid, or a trapezoid, as long as it is a shape that can be placed all over within a plane without a gap. The same effects as those described above can be obtained by the wirings tilted with respect to the Y-axis direction.

Modification Example 1

Next, Modification Example 1 of the fifth exemplary embodiment will be described by referring to FIG. 21-FIG. 23.

(Structure)

In the stereoscopic image display device according to Modification Example 1 of the fifth exemplary embodiment, as shown in FIG. 21, the external shape of the left-eye pixels 51 and the right-eye pixel 52 is a trapezoid. Further, the layout has the twofold rotational symmetry axis for the reference point 59 on the segment 55 of FIG. 21, so that the layout of the reflection plate 41 is equivalent when rotated by 180 degrees. As in the case of FIG. 1, the left and right reflection plates of the display element 13 are arranged asymmetrically with respect to the left-eye pixel central axis line YL 55, the right-eye pixel central axis line YR 56, and the central axis line YG 57 of the display element 13. Further, the reference point 59 may be the center of the mass between the pixels that are neighboring to each other in the direction orthogonal to the image distributing direction 14.

Regarding the symmetry in terms of the reflection plate layout alone, each of the left-eye pixel central axis line YL 55, the right-eye pixel central axis line YR 56, and the central axis line YG 57 of the display element 13 does not work as the glide plane (g) of the reflection plate. The reflection plates are arranged in a translated manner in every two pixels. That is, the reflective display areas of the display elements 13 neighboring to each other in the +Y direction are in different layout from each other, and the display elements 13 are disposed periodically in the +Y direction. Other structures are the same as those of the fifth exemplary embodiment described above.

FIG. 23 is a model illustration showing layout of pixel transistors that are arranged by corresponding to the pixel parts of FIG. 21. In the fifth exemplary embodiment, as shown in FIG. 23, gate lines G1-G5 extended in the row direction (that is, the X-axis direction) are disposed on the face of the inner side (that is, the face of the +Z direction side) of the TFT substrate 2a (see FIG. 2). The gate lines G1-G5 are also referred to as gate lines G as the general term.

Further, data lines D1-D7 extending in the column direction (that is, the Y-axis direction) are disposed on the same face of the TFT substrate 2a. The data lines D1-D7 are also referred to as data lines D as the general term. The data lines function to supply display data signals to the thin film transistors.

In the fifth exemplary embodiment, the gate lines G are extended along the X-axis direction, and there are a plurality of them arranged along the Y-axis direction. Further, the pixel (left-eye pixel 51 or right-eye pixel 52) is disposed in the vicinity of the intersection point between the gate line and the data line. Particularly, in FIG. 23, the pixel connected to the gate line G3 and the data line D2 is marked as P32, for example, in order to clearly show the connecting relation of the pixel with respect to the gate line and the data line. That is, the numeral after "P" is the number applied after "G" for the gate line, and the numeral thereafter is the numeral after "D" for the data line. FIG. 22 shows a specific example of each of the pixels P11, P23, P32, and P22 among the pixels P11, P23, P13, - - - shown in FIG. 23.

In FIG. 22, a pixel electrode 4PIX, a pixel thin film transistor 4TFT, and a storage capacitance line 4CS are disposed in the pixel P11. The pixel thin film transistor 4TFT is a MOS-type thin film transistor, either a source electrode or a drain electrode is connected to the data line D via a contact hole 4CONT, while the other is connected to the pixel electrode 4PIX. Further, as shown in FIG. 22, the data lines are arranged to be tilted from the +Y direction.

Here, connecting relations regarding the gate lines, the data line, and each pixel will be summarized.

In FIG. 23, a pixel P31 and a pixel P32 are considered first. These two pixels are connected to the gate line G3. That is, the two pixels take the gate line G3 as the common gate line. The pixels that are arranged neighboring to each other in the Y-axis direction and use a gate line in common are referred to as a neighboring pixel pair, and those pixels in a pair is expressed as (P31, P32) for convenience' sake. Each pixel configuring the neighboring pixel pair (P31, P32) is connected to different data lines. That is, the pixel P31 is connected to the data line D1, and the pixel P32 is connected to the data line D2.

A neighboring pixel pair (P22, P23) and a neighboring pixel pair (P43, P42) are placed as neighboring pairs of the neighboring pixel pair (P31, P32) in the +X direction. The neighboring pixel pair (P22, P23) takes the gate line G2 as the common gate line. Note here that the expression "the neighboring pixel pair takes the gate line G2 as the common gate line" means that each pixel configuring the neighboring pixel pair is connected to and controlled by the gate line G2, i.e., the gate line disposed between those pixels. The neighboring pixel pair (P31, P32) takes the gate line G3 as the common gate line, so that the neighboring pixel pair (P31, P32) and the neighboring pixel pair (P22, P23) take different gate line as the common gate line. The common gate lines for those pixel pairs are neighboring to each other.

The neighboring pixel pair (P42, P43) is also disposed to be neighboring to the neighboring pixel pair (P31, P32) in the +X direction. These neighboring pixel pairs also take different gate line as the common gate line. Further, a neighboring pixel pair (P33, P34) is arranged in the +X direction for the neighboring pixel pair (P22, P23) or the neighboring pixel pair (P42, P43). It is the same as the case of the neighboring pixel pair (P31, P32) that the neighboring pixel pair (P33, P34) takes the gate line G3 as the common gate line. That is, by every other pixel column, the neighboring pixel pair that takes the same gate line as the common gate line is disposed. In other words, the gate line connected to the neighboring pixel pair that configures the right-eye pixel is not connected to the neighboring pixel pair that configure the left-eye pixel.

Further, as in the case of the fifth exemplary embodiment, the reflection plate 41 is provided to cover the pixel thin film transistor 4TFT, and the reflective area pixel electrode 4RPIX is provided on the reflection plate 41. That is, a driving circuit for variably controlling display actions of each of the corresponding pixels P11, P32, - - - is provided on the back-face side of the respective pixel within the sectioned area of each of the pixels P11, P32, - - -, the reflective display area of each of the pixels P11, P32, - - - is provided on the top face of the driving circuit, and the above-described reflection plate 41 is provided in the reflective display area. The driving circuit for variably controlling the display actions of each pixel is the so-called pixel switching device, and it is normally configured with a thin film transistor.

With the above-described configuration, the display device according to Modification Example 1 of the fifth exemplary embodiment includes: data lines for supplying display data to each of the pixels; pixel switching devices for transmitting display data signals from the data lines to the pixels; and gate lines for controlling the pixel switching devices, wherein: the neighboring pixel pair arranged by sandwiching the gate line is controlled by the gate line disposed between the pixels; the pixels configuring the neighboring pixel pair are connected to different data lines; and the neighboring pixel pairs neighboring to each other along the extending direction of the gate lines are connected to different gate lines. With such layout, the pixel thin film transistors can be efficiently arranged on the back-face side of the reflection plates with Modification Example 1 of the fifth exemplary embodiment.

In the explanations above, there has been described that the reflection plate is provided so as to cover the pixel thin film transistor. However, the reflection plate may be provided to cover only a part of the pixel thin film transistor. Further, the reflection plate may be provided in the storage capacitance. That is, by utilizing the part that is not used for the transmissive display for the reflective display, the pixels can be used efficiently for the display. This makes it possible to improve the display performance.

Further, a storage capacitance line 4CS for forming a holding capacitance may be disposed in each of the pixels, and the storage capacitance line 4CS may be connected between the pixels that are neighboring to each other in the extending direction of the gate lines. Further, the intersection points between the storage capacitance lines 4CS and the data line 4D may be located along the data line 4D. With such structure, the display areas of the pixels can be arranged more efficiently, so that it is possible to improve the display performance.

In the transmissive display areas 511 and 521 of each of the pixels P11, P12, P13, - - - of Modification Example 1 of the fifth exemplary embodiment, it is possible to send out still clearer image information to the viewing area. Therefore, the exemplary object of the present invention can be achieved effectively with high efficiency. The above-described pixel electrodes 4PIX of the transmissive display areas 511, 521 are electrically connected to the pixel electrode 4RPIX of the reflective display area.

It is defined to call the electrode to which the pixel electrode 4PIX or the pixel electrode 4RPIX is connected as the source electrode, and to call the electrode that is connected to the signal line (data line) D as the drain electrode. Further, the gate electrode of the pixel thin film transistor 4TFT is connected to the gate line G. The storage capacitance line CS is connected to the other electrode of the storage capacitance line 4CS. Further, a common electrode 4COM is formed on the inner side of the counter substrate 2b, and a pixel capacitance 4CLC is formed between the pixel electrode 4PIX and the reflective area pixel electrode 4RPIX.

(Effects)

Since the reflective display areas 512 and 522 are arranged in a scattered manner in a checkered pattern within the display plane, the reflected light making incident from the outside can be easily scattered. This provides an effect of making the reflected light more uniform. Further, the reflection plates of Modification Example 1 has the layout that has twofold rotational symmetry, so that the same display quality as that of the original state can be maintained even when images are viewed from a position where the stereoscopic image display device is rotated by 180 degrees within the display plane. Therefore, the present invention can be preferably applied to a mobile device whose screen can be rotated by 180 degrees and a video camera whose monitor can be rotated. Particularly, when displaying video signals of the data lines through having positive/negative polarities by every other line as shown in FIG. 23, it is possible to set the same potential for the left-eye pixel 51 and the right-eye pixel 52. This makes it possible to decrease disclination caused due to the potential difference between the left and right sides, so that the displays on the left and right pixels can be made uniform.

As described above, as in the case of FIG. 1, the left and right reflection plates of the display element 13 according to Modification Example 1 are arranged asymmetrically with respect to the left-eye pixel central axis line YL 55, the right-eye pixel central axis line YR 56, and the central axis line YG 57 of the display element 13. The display elements 13 neighboring to each other in the +Y direction have different reflective display area layout from each other, and the display elements 13 are disposed periodically in the +Y direction. Regarding the symmetry in terms of the reflection plate 41, each of the left-eye pixel central axis line YL 55, the right-eye pixel central axis line YR 56, and the central axis line YG 57 of the display element 13 works as the glide plane (g) for the reflection plate.

Further, there is also glide plane (g) in the direction that is in parallel to the +X direction. The layout of the reflection plate has twofold rotational symmetry, so that the layout of the reflection plate is equivalent when rotated by 180 degrees with respect to the twofold rotational symmetry axis 59. Therefore, there are the twofold rotational symmetry axis and two independent glide planes (g). It is expressed as having the symmetry of at least "p2gg" according to the international symbols of the two-dimensional space group. Other structures are the same as those of the above-described fifth exemplary embodiment shown in FIG. 20.

With Modification Example 1 of the fifth exemplary embodiment, there are the glide planes (g) that are in parallel to the +Y direction. Thus, reflected images can be compensated between the pixels that are neighboring to the +Y direction. This makes it possible to provide high-quality reflective displays that exhibit no partial deterioration in the luminance regardless of the viewing positions. Furthermore, since the reflective display areas 512 and 522 are arranged in a scattered manner in a checkered pattern within the display plane, the reflected light making incident from the outside can be easily scattered. This provides an effect of making the reflected light more uniform.

Further, due to the glide plane (g) in the direction in parallel to the +X direction, the reflection component of the neighboring pixels of the +X direction can be compensated, when the fly-eye lens is used. Thereby, the quality of the reflective display can be improved. Further, the reflection plates of Modification Example 1 are arranged in the layout that has the twofold symmetry, so that the same display quality as that of the original state can be maintained even when images are viewed from a position where the stereoscopic image display device is rotated by 180 degrees. Therefore, the present invention can be preferably applied to a mobile device whose screen can be rotated by 180 degrees and a video camera whose monitor can be rotated.

Modification Example 2

Next, Modification Example 2 of the fifth exemplary embodiment will be described by referring to FIG. 24.

As shown in FIG. 24, the external shape of the left-eye pixel 51 and the right-eye pixel 52 of the stereoscopic image display device according to Modification Example 2 is a trapezoid, and the layout of the reflection plate is the same as the case of the second exemplary embodiment (FIG. 11). Thus, the reflective area of Modification Example 2 is separated to the left and right pixel areas by a segment that is tilted non-parallel to the +Y direction.

Regarding the symmetry of the reflective display areas of Modification Example 2 shown in FIG. 24, the left and right reflection plates in each of the pixels 51, 52 are arranged asymmetrically with respect to the left-eye pixel central axis line YL 55 and the right-eye pixel central axis line YR 56. The left-eye pixel central axis line YL 55 and the right-eye pixel central axis line YR 56 are the glide planes (g) for the reflective display areas. Further, the reflective display areas are arranged line-symmetrically (reflection symmetrically) with respect to the central axis line YG 57 of the display element 13, thereby forming a mirror plane (m). Further, the layout of the reflection plate has the twofold rotational symmetry, and it is equivalent to that of the original state even when rotated by 180 degrees about the twofold rotational symmetry axis 59. Other structures are the same as those of the above-described fifth exemplary embodiment (FIG. 20).

With Modification Example 2 shown in FIG. 24, the reflective area of Modification Example 2 is separated to the left and right pixel areas by a segment that is tilted non-parallel to the +Y direction. Thus, it is possible to obtain the neighboring pixel compensating effect with small dimensions. Thereby, the performance of the reflective displays can be improved. Further, since the reflective area can be formed with a small space, the transmissive area can be set larger, thereby making it possible to form the pixels with wide openings. Other structures and operational effects are the same as those of the above-described fifth exemplary embodiment (FIG. 20).

Modification Example 3

Next, Modification Example 3 of the fifth exemplary embodiment will be described by referring to FIG. 25.

In the stereoscopic image display device according to Modification Example 3, as shown in FIG. 25, the reflective display areas are disposed along the oblique lines of the trapezoid, and those areas are point-symmetry with respect to the center point G. Further, the reflective display area is extended to the top and bottom ends of the pixel in the +Y direction. When the reflective areas of two display elements neighboring to each other in the +Y direction are cut along the +Y direction, the total values of the lengths of the cut areas are the same at any positions. Other structures are the same as those of the above-described fifth exemplary embodiment (FIG. 20).

With Modification Example 3 of the fifth exemplary embodiment (FIG. 25), the total values of the dimensions of the reflective display areas in the +Y direction are uniform. Thus, the reflective display can be made more uniform than the cases of each exemplary embodiment described above. This makes it possible to provide high-quality reflective displays that exhibit no partial deterioration in the luminance regardless of the viewing positions.

Sixth Embodiment

Next, a sixth exemplary embodiment of the invention will be described by referring to FIG. 26.

Figure 26:
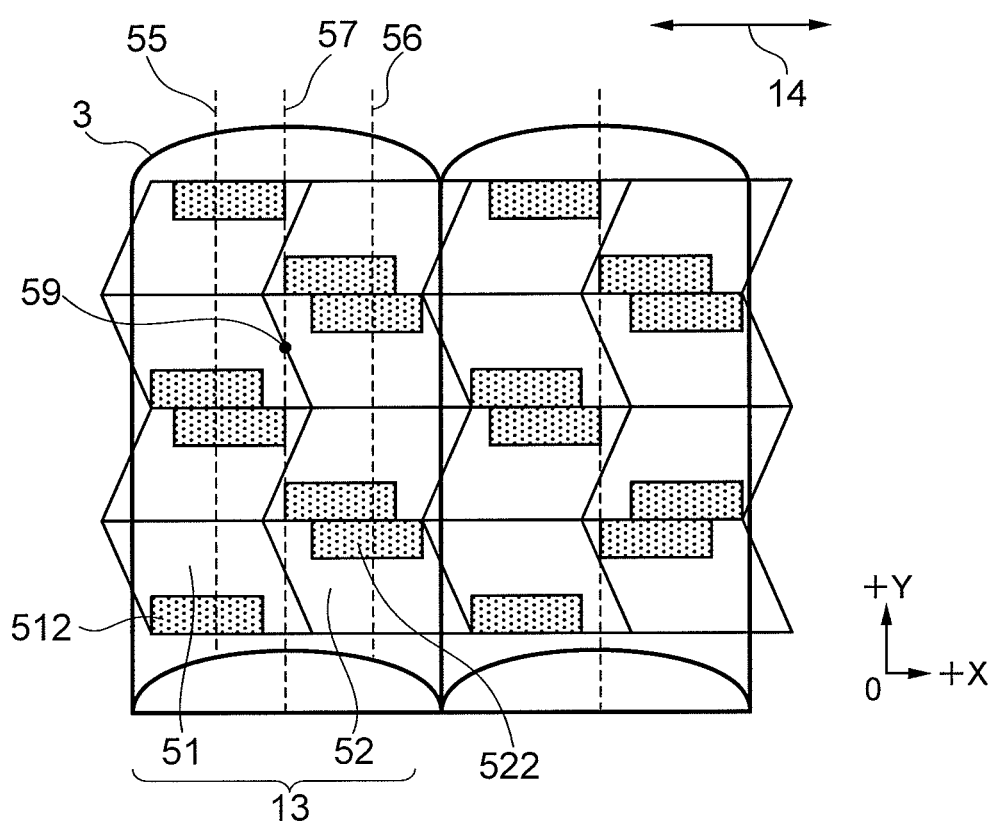
FIG. 26 is a top plan view showing a part of a stereoscopic image display device according to a sixth exemplary embodiment of the invention, which is a model illustration showing layout of the structural contents of the display element parts.

In a stereoscopic image display device according to the sixth exemplary embodiment, as shown in FIG. 26, quadrilateral transmissive areas 511, 521 as the display areas are formed in the left-eye pixel 51 and the right-eye pixel 52. The sides thereof extending opposing to each other are in parallel, and tilted with respect to the +Y direction. That is, the opening part 5 is substantially in a parallelogram on a plan view.

Further, the external shape of the left-eye pixel 51 and the right-eye pixel 52 is a quadrilateral, and those pixels are disposed in a translated manner to the +X direction. Furthermore, the pixels are disposed to the +Y direction by being inverted line-symmetrically with respect to the axis that is in parallel to the +X direction, thereby forming a matrix.

There is no central axis line of line symmetry. Thus, the symmetry axis when rotating the quadrilaterals of the pixels 51, 52 by 180 degrees (i.e., the twofold rotational symmetry axis) is taken as the center point, and a segment that passes through the center point and is perpendicular to the image distributing direction is taken as the left-eye-pixel central axis line YL 55 (the right-eye pixel central axis line YR 56). Similarly, for the display element unit, a segment that passes through the rotation center and is perpendicular to the image distributing direction is taken as the central axis line YG 57 of the display element.

The left-eye reflective display area 512 is disposed asymmetrically with respect to the left-eye pixel central axis line YL 55, and the right-eye reflective display area 522 is disposed asymmetrically with respect to the right-eye pixel central axis line YR 56. Further, the left-eye reflective display area 512 and the right-eye reflective display area 522 are disposed asymmetrically with respect to the central axis line YG 57 of the display element 13. The reflective areas of the left and right pixels neighboring to each other in the +X direction are arranged in different positions, which coincide with each other when rotated by 180 degrees.

The reflection plate layout on the display plane according to the sixth exemplary embodiment has a twofold rotational symmetry axis, and it has the symmetry of at least "p2" according to the international symbols of the two-dimensional space group. Other structures are the same as those of the above-described first exemplary embodiment (FIG. 1-FIG. 6).

In the sixth exemplary embodiment (FIG. 26), the external shape is the parallelogram. Therefore, there is such an advantage that the reflective display areas of the display pixels 13 that are neighboring to each other in the +Y direction can easily be arranged alternately, there by making it possible to obtain a large numerical aperture. Further, while the sixth exemplary embodiment has been described by referring to the case of substantially parallelogram pixels, the pixels may have the rotational symmetry of twofold rotations or more. The same effects can be obtained by arranging the reflective areas by taking the segment that passes through the rotational center and is perpendicular to the image distributing direction as the central axis line YG of the display element.

Seventh Exemplary Embodiment

Next, a seventh exemplary embodiment of the invention will be described by referring to FIG. 27.

Figure 27:
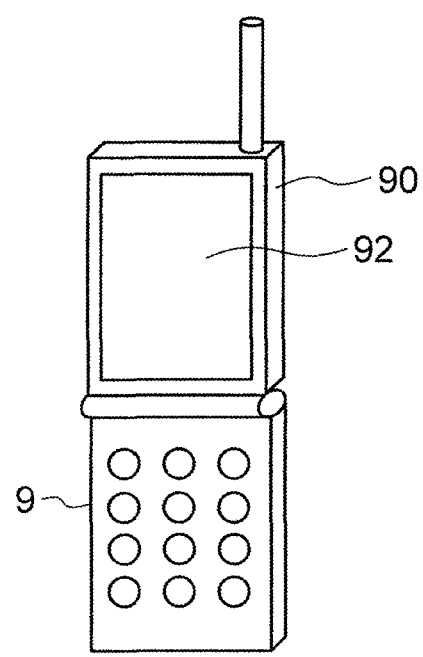
FIG. 27 is a perspective view showing a portable terminal device according to a seventh exemplary embodiment of the invention.

FIG. 27 is a perspective view showing a portable terminal device according to the seventh exemplary embodiment. As shown in FIG. 27, with the seventh exemplary embodiment, an image display device 90 is mounted to a portable telephone 9 as a portable terminal device. The image distributing direction 14 of the cylindrical lenses that configure the lenticular lens 3 is set to the lateral direction of the image display device 90.

Further, a plurality of pixel pairs each configured with a left-eye pixel and a right-eye pixel are arranged in matrix on a display panel 92 of the image display device 90. The arranging direction of the left-eye pixel and right-eye pixel in a single pixel pair is the arranging direction of the cylindrical lenses, i.e., the lateral direction (horizontal direction) of the screen. The structures of this exemplary embodiment other than those described above are the same as the case of the first exemplary embodiment described above.

Next, actions of the image display device according to this exemplary embodiment will be described. The left-eye pixel 51 of a transflective display panel 2 displays an image for the left eye, and the right-eye pixel 52 displays an image for the right eye. The image for the left eye and the image for the right eye are stereoscopic images having parallax from each other. Further, both images may be images independent from each other or images that show information related to each other.

The effects of the seventh exemplary embodiment other than those described above are the same as the case of the first exemplary embodiment described above. The seventh exemplary embodiment can also be combined with one of the second to sixth exemplary embodiments described above.

Each of the first to seventh exemplary embodiment has been described by referring to the case where the display device is loaded on a portable telephone or the like for displaying stereoscopic images by supplying images having parallax from each other to the left and right eyes of a single viewer or to the case of image display device which simultaneously supplies a plurality of kinds of images to a single viewer. However, the image display device according to the present invention is not limited only to such cases. The image display device may be a device provided with a large-scaled display panel, which supplies a plurality of different images to a plurality of viewers.

The stereoscopic image display devices according to each of the above-described embodiments can preferably be applied to portable devices such as portable telephones, and fine stereoscopic images can be displayed. Further, when the stereoscopic image display devices according to each of the exemplary embodiments are applied to the portable devices, the viewer can adjust the positional relation between the own eyes and the display screen at will, unlike the case of applying the stereoscopic image display devices to large-scaled display devices. Thus, the optimum viewable range can be found promptly. Furthermore, the stereoscopic image display devices according to each of the exemplary embodiments can be applied not only to the portable telephones but also to portable terminal devices such as portable terminals, PDAs, game machines, digital cameras, and digital video cameras.

Further, while the contents of the explanations provided above regard to the case where the convex parts of the lens are arranged to be on the viewer side, the same effects can be obtained even with the case where the convex parts of the lens are arranged to be on the display device side. Furthermore, the stereoscopic image display devices according to each of the above-described embodiments can preferably be applied to portable devices such as portable telephones, and fine stereoscopic images can be displayed. Further, when the stereoscopic image display devices according to each of the exemplary embodiments are applied to the portable devices, the viewer can adjust the positional relation between the own eyes and the display screen at will, unlike the case of applying the stereoscopic image display devices to large-scaled display devices. Thus, the optimum viewable range can be found promptly.

As described above, as the common structure, each of the above-described embodiments and the modification examples have the following features. That is: a plurality of display elements each including at least a pixel for displaying a first-viewpoint image and a pixel for displaying a second-viewpoint image are arranged; each pixel has a transmissive display area for transmitting light and a reflective display area for reflecting external light; data lines for supplying display data to each of the pixels, pixel switching device for transmitting display data signals from the data lines to each of the pixels, and the gate lines for controlling the pixel switching devices are provided; actions of a neighboring pixel pair disposed by sandwiching the gate line is controlled by the gate line disposed between the pixels; each of the pixels configuring the pixel pair is connected to a different data line from each other; the neighboring pixel pair neighboring to each other in the extending direction of the gate line is connected to different gate lines; an optical device for distributing light emitted from each of the pixels to different directions from each other along the extending direction of the gate lines is provided; the reflective display areas of each of the pixels are provided to cover the set positions of the pixel switching devices; and a reflection plate for reflecting external light is provided in the reflective display area. Therefore, as described above, the exemplary object of the present invention can be achieved effectively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The image display device according to the present invention can be effectively applied as the image display panel not only to portable telephones but also to portable terminal devices such as portable terminals, PDAs, game machines, digital cameras, and digital video cameras. Therefore, its usage is very versatile.

What is claimed is:

1. An image display device, comprising: a plurality of arranged display elements each including at least a pixel for displaying a first-viewpoint image and a pixel for displaying a second-viewpoint image, each of the pixels having a transmissive display area for transmitting light and a reflective display area for reflecting external light; and an optical device for distributing light emitted from each of the pixels to different directions from each other, wherein each of the plurality of display elements arranged by corresponding to the optical device uses at least two kinds of patterns having different reflective display area layout, the reflective display areas of each of the display elements are arranged asymmetrically with respect to an arbitrarily set segment that is on a face of the respective pixel and passes the respective display element arranged in a direction orthogonal to an emission light distributing direction by the optical device, and each segment is arranged to be a glide plane for the reflective display area, and regarding each of the display elements having the different reflective display area layout, the display elements having the reflective display area of a same pattern is repeatedly arranged in a periodic manner on the face of each of the pixels along the emission light distributing direction of the optical device.

2. The image display device as claimed in claim 1, wherein the arbitrarily set segment that passes through the respective display element is defined as a segment that connects center points of each of the display elements.

3. The image display device as claimed in claim 1, wherein: the reflective display area provided in each of the display elements adjacent with each other on the face of each of the pixels and on a common center line of each of the display elements that are arranged along the emission light distributing direction of the optical device is continuously disposed without a break to the emission light distributing direction, when at least two of the display elements are stacked on one another and seen through.

4. The image display device as claimed in claim 1, wherein shape of each pixel configuring the display element is set as a polygonal shape.

5. The image display device as claimed in claim 1, wherein: each pixel configuring each of the display elements is configured with a polygonal pixel that has a line-symmetry axis on the face of each of the pixels, which is in parallel to a common center line of each of the pixels that are arranged in the direction orthogonal to the emission light distributing direction of the optical device; and the reflective display area in each of the pixels is arranged asymmetrically with respect to the line symmetry axis.

6. The image display device as claimed in claim 1, wherein the reflective display area is provided separately at least in two places within each of the pixels.

7. The image display device as claimed in claim 1, wherein the optical device for distributing the light emitted from each of the pixels towards different directions from each other is a lenticular lens or a fly-eye lens.

8. The image display device as claimed in claim 1, wherein the reflective display area of the display element is divided to the pixel for displaying the image for the first-viewpoint and the pixel for displaying the image for the second-viewpoint by a segment that is asymmetrically tilted with respect to a segment perpendicular to the image distributing direction.

9. The image display device as claimed in claim 1, wherein, when the display element is stacked over the display element that is rotated by 180 degrees about the center point of the display element and the stacked display elements are seen through, the reflective display areas are consistent with each other.

10. The image display device as claimed in claim 1, wherein:

a pixel switching device for controlling a display changeover action of each of the pixels is provided in a sectioned area of the corresponding pixel, and a reflection plate is provided to cover a set position of the pixel switching device.

11. The image display device as claimed in claim 1, comprising: data lines for supplying display data to each of the pixels; pixel switching devices for transmitting display data signals from the data lines to each of the pixels; gate lines for controlling the pixel switching devices; and an optical device for distributing light emitted from each of the pixels to different directions from each other along the extending direction of the gate lines, wherein:

an action of a pixel pair disposed by sandwiching the gate line is controlled by the gate line disposed between the pixels; each of the pixels configuring the pixel pair is connected to a different data line; the pixel pair neighboring to each other in the extending direction of the gate line is connected to different gate lines; and the reflective plates are provided to cover the set positions of the pixel switching devices.

12. A terminal device, comprising the image display device of claim 1 mounted for display.

* * * * *